US008341605B2

(12) United States Patent
Cobb et al.

(10) Patent No.: US 8,341,605 B2
(45) Date of Patent: *Dec. 25, 2012

(54) USE OF EXECUTION FLOW SHAPE TO ALLOW AGGREGATE DATA REPORTING WITH FULL CONTEXT IN AN APPLICATION MANAGER

(75) Inventors: Jeffrey R. Cobb, Belmont, CA (US); Daryl L. Puryear, San Mateo, CA (US); Gabriel J. Vanrenen, San Francisco, CA (US)

(73) Assignee: CA, Inc., Islandia, NY (US)

( * ) Notice: Subject to any disclaimer, the term of this patent is extended or adjusted under 35 U.S.C. 154(b) by 1436 days.

This patent is subject to a terminal disclaimer.

(21) Appl. No.: 11/304,040

(22) Filed: Dec. 15, 2005

(65) Prior Publication Data

US 2007/0143743 A1    Jun. 21, 2007

(51) Int. Cl.
*G06F 9/44* (2006.01)
*G06F 15/173* (2006.01)

(52) U.S. Cl. .................. 717/130; 717/128; 709/224

(58) Field of Classification Search .......... 717/127–133; 714/39; 709/201
See application file for complete search history.

(56) References Cited

U.S. PATENT DOCUMENTS

| | | | |
|---|---|---|---|
| 5,375,199 A | 12/1994 | Harrow et al. | |
| 5,606,699 A * | 2/1997 | De Pauw et al. | 719/315 |
| 5,655,081 A | 8/1997 | Bonnell et al. | |
| 5,870,607 A | 2/1999 | Netzer | |
| 5,933,640 A | 8/1999 | Dion | |
| 5,978,594 A | 11/1999 | Bonnell et al. | |
| 5,996,092 A | 11/1999 | Augsburg et al. | |
| 6,026,428 A | 2/2000 | Hutchison | |
| 6,141,699 A | 10/2000 | Luzzi et al. | |
| 6,202,199 B1 | 3/2001 | Wygodny | |
| 6,219,826 B1 * | 4/2001 | De Pauw et al. | 717/116 |
| 6,247,146 B1 * | 6/2001 | Wheatley et al. | 714/38 |
| 6,263,298 B1 | 7/2001 | Kerman et al. | |

(Continued)

OTHER PUBLICATIONS

De Pauw, W., et al., "Web Services Navigator: Visualizing the Execution of Web Services". IBM Systems Journal [online], 2005, vol. 44 No. 4 [retrieved Aug. 31, 2012]. Retrieved from Internet: <http://citeseerx.ist.psu.edu/viewdoc/download?doi=10.1.1.93.3568&rep=rep1&type=pdf>, pp. 821-845.*

(Continued)

*Primary Examiner* — Isaac Tecklu
*Assistant Examiner* — Todd Aguilera
(74) *Attorney, Agent, or Firm* — Vierra Magen Marcus & DeNiro LLP

(57) ABSTRACT

Data relating to execution flows at a computer system is aggregated across multiple execution flows by categorizing each execution flow into an execution flow shape. The execution flows may represent sequences of software components that are invoked or other computer system resources that are consumed. The execution flow shapes are developed by observing and recording the execution flows at the computer system and applying lossy compression rules. Execution flows are categorized into an execution flow shape which is a closest match. The execution flow data may be aggregated by an agent at the computer system, and communicated to a manager for subsequent use. The aggregation combines the information from all execution flows into a small enough data set that can be reported without consuming unduly large processing overhead while still preserving as many of the interesting aspects of the execution flows as possible.

32 Claims, 13 Drawing Sheets

U.S. PATENT DOCUMENTS

| | | | |
|---|---|---|---|
| 6,282,701 | B1 | 8/2001 | Wygodny et al. |
| 6,327,699 | B1 | 12/2001 | Larus |
| 6,332,212 | B1 * | 12/2001 | Organ et al. ............ 717/128 |
| 6,347,383 | B1 | 2/2002 | Elnozahy |
| 6,353,924 | B1 | 3/2002 | Ayers |
| 6,691,207 | B2 | 2/2004 | Litt |
| 6,708,293 | B2 * | 3/2004 | Kaler et al. ............ 714/39 |
| 6,792,460 | B2 | 9/2004 | Oulu et al. |
| 6,971,092 | B1 | 11/2005 | Chilimbi |
| 7,076,784 | B1 | 7/2006 | Russell |
| 7,111,282 | B2 * | 9/2006 | Stephenson ............ 717/130 |
| 7,139,779 | B1 | 11/2006 | Kornelson et al. |
| 7,207,038 | B2 | 4/2007 | Bicsak et al. |
| 7,293,259 | B1 * | 11/2007 | Dmitriev ............ 717/130 |
| 7,308,681 | B2 | 12/2007 | Ekanadham |
| 7,367,025 | B1 | 4/2008 | Nikolov et al. |
| 7,392,510 | B1 | 6/2008 | Treder et al. |
| 7,401,324 | B1 * | 7/2008 | Dmitriev ............ 717/130 |
| 7,562,259 | B2 | 7/2009 | Swoboda |
| 2002/0038228 | A1 | 3/2002 | Waldorf et al. |
| 2002/0062237 | A1 | 5/2002 | Matsumoto |
| 2002/0073195 | A1 | 6/2002 | Hellerstein et al. |
| 2002/0174222 | A1 | 11/2002 | Cox |
| 2003/0009507 | A1 | 1/2003 | Shum |
| 2003/0084018 | A1 | 5/2003 | Chintalapati |
| 2003/0236689 | A1 | 12/2003 | Casati |
| 2004/0034593 | A1 | 2/2004 | Toneguzzo |
| 2004/0075690 | A1 | 4/2004 | Cirne |
| 2004/0078691 | A1 | 4/2004 | Cirne et al. |
| 2004/0103401 | A1 * | 5/2004 | Chilimbi et al. ............ 717/130 |
| 2005/0021748 | A1 | 1/2005 | Garcea et al. |
| 2005/0039187 | A1 | 2/2005 | Avakian et al. |
| 2005/0114508 | A1 | 5/2005 | DeStefano |
| 2005/0183084 | A1 * | 8/2005 | Cuomo et al. ............ 718/100 |
| 2006/0004802 | A1 | 1/2006 | Philllips |
| 2006/0123022 | A1 | 6/2006 | Bird |
| 2006/0218543 | A1 * | 9/2006 | Boger ............ 717/157 |
| 2007/0107053 | A1 | 5/2007 | Shraim |
| 2007/0143323 | A1 * | 6/2007 | Vanrenen et al. ............ 707/101 |
| 2007/0169052 | A1 * | 7/2007 | Vanrenen et al. ............ 717/154 |

OTHER PUBLICATIONS

Office Action dated Feb. 2, 2009, U.S. Appl. No. 11/304,041, filed Dec. 15, 2005.
Office Action dated Dec. 26, 2007, U.S. Appl. No. 11/304,041, filed Dec. 15, 2005.
Response to Office Action dated Mar. 25, 2008, U.S. Appl. No. 11/304,041, filed Dec. 15, 2005.
Office Action dated Jul. 24, 2008, U.S. Appl. No. 11/304,041, filed Dec. 15, 2005.
"Using the WorkArea Facility," Version 4.0, WebSphere Application Server, IBM Corp., Mar. 2001.
"JSR 149: Work Area Service for J2EE," Sun Microsystems, www.jcp.org/en/jsr/detail?id=149&showPrint, printed Aug. 22, 2005.
Sodhi,et al. "Skeleton Based Performance Prediction on Shared Networks," CCGRID 2004: The IEEE International Symposium on Cluster Computing and the Grid, Apr. 2004, Chicago, IL.
Office Action dated Aug. 4, 2009, U.S. Appl. No. 11/304,153, filed Dec. 15, 2005.
Office Action dated Oct. 14, 2009, U.S. Appl. No. 11/304,041, filed Dec. 15, 2005.
Office Action dated Jan. 6, 2010, U.S. Appl. No. 11/304,153, filed Dec. 15, 2005.
Amendment dated Jan. 14, 2010, U.S. Appl. No. 11/304,041, filed Dec. 15, 2005.
Office Action dated Mar. 25, 2010, U.S. Appl. No. 11/304,041, filed Dec. 15, 2005.
Response to Office Action dated Apr. 6, 2010, U.S. Appl. No. 11/304,153, filed Dec. 15, 2005.
Amendment dated Jun. 18, 2010, U.S. Appl. No. 11/304,041, filed Dec. 15, 2005.
Final Office Action dated Jun. 20, 2012, U.S. Appl. No. 11/304,153, filed Dec. 15, 2005.
Response to Final Office Action dated Jul. 10, 2012, U.S. Appl. No. 11/304,153, filed Dec. 15, 2005.
Notice of Allowance & Fee(s) Due dated Jul. 20, 2012, U.S. Appl. No. 11/304,153, filed Dec. 15, 2005.
Non-Final Office Action dated Oct. 26, 2010, U.S. Appl. No. 11/304,041, filed Dec. 15, 2005.
Response to Office Action dated Jan. 18, 2011, U.S. Appl. No. 11/304,041, filed Dec. 15, 2005.
Response to Office Action dated May 23, 2012, U.S. Appl. No. 11/304,153, filed Dec. 15, 2005.
Notice of Allowance and Fee(s) Due dated Apr. 4, 2011, U.S. Appl. No. 11/304,041, filed Dec. 15, 2005.
Non-Final Office Action dated Mar. 12, 2012, U.S. Appl. No. 11/304,153, filed Dec. 15, 2005.

* cited by examiner

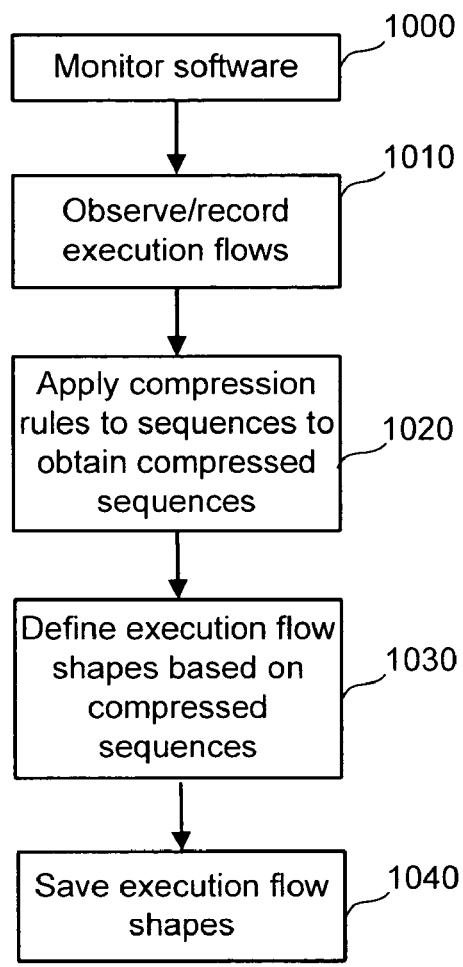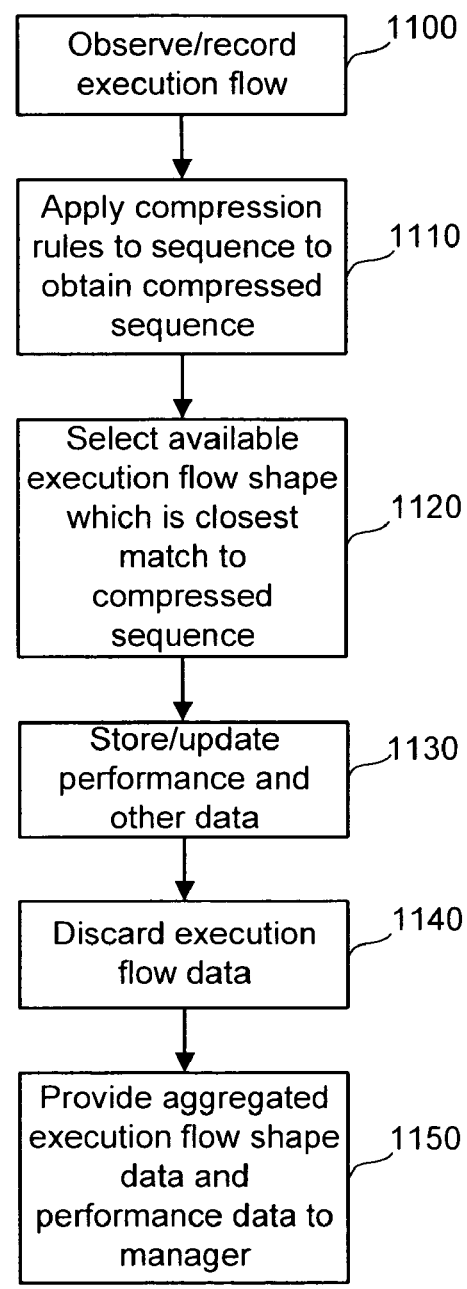

USE OF EXECUTION FLOW SHAPE TO ALLOW AGGREGATE DATA REPORTING WITH FULL CONTEXT IN AN APPLICATION MANAGER

CROSS-REFERENCE TO RELATED APPLICATIONS

This application is related to co-pending commonly assigned: (a) U.S. patent application Ser. No. 11/304,041, filed concurrently herewith on Dec. 15, 2005 (published as US2007/0143323 on Jun. 21, 2007 and issued as U.S. Pat. No. 7,949,673 on May 24, 2011), titled "Correlating Cross Process And Cross Thread Execution Flows In An Application Manager", and (b) U.S. patent application Ser. No. 11/304, 153, filed concurrently herewith Dec. 15, 2005 (published as US2007/0169052 on Jul. 19, 2007), titled "Execution Flow Shape Normalization For Aggregate Data Reporting In An Application Manager", each of which is incorporated herein by reference.

BACKGROUND OF THE INVENTION

1. Field of the Invention

The present invention is directed to technology for monitoring applications in a computing environment.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that the applications perform as expected. To this end, various application management techniques have been developed.

For example, for component-based applications, such as those based on JAVA™ 2 Platform Enterprise Edition (J2EE™) (a type of platform for server programming), one approach is to collect data about the individual software components that are invoked in an application. A software component generally refers to a software technology for encapsulating software functionality. A software component has characteristics including: multiple-use (reusable), non-context-specific, composable with other components, encapsulated, and a unit of independent deployment and versioning. Alternatively, a component can be considered to be an object written to a specification, such as JAVA BEANS™ (a type of software component), or the Component Object Model, a MICROSOFT platform for software componentry. A component can also include a web server or a database, for instance. Software components are typically invoked by processes or threads executing in an application, middleware or other software. For example, for a web-based e-commerce application, a process at an application server is typically initiated by a request to the server, such as a user request to purchase an item. The process may invoke a number of components to carry out the steps necessary to allow the user to purchase the item. For example, a shopping cart component may be used to allow the user to identify the item desired, the payment method and the shipping information. A reservation component may be used to reserve the item while a credit check component verifies the user's credit card information. Once the credit card information is verified, an inventory component is updated based on the item purchased, and a shipping component is invoked to arrange for the item to be shipped, such as by contacting a warehouse. An order completion component may be invoked to confirm the purchase to the user such as by providing an order confirmation number and a tracking number on a web page. Moreover, a given component may be invoked more than once during an application.

In particular, an execution flow can be traced to identify each component that is invoked as well as obtain performance data such as the execution time of each component. An execution flow refers generally to the sequence of steps taken when a computer program executes. Tracing refers to obtaining a detailed record, or trace, of the steps a computer program executes. One type of trace is a stack trace. Traces can be use as an aid in debugging. However, information cannot be obtained and analyzed from every execution flow without maintaining an excessive amount of overhead data and thereby impacting the very application which is being monitored. One way to address this problem is by sampling so that information is obtained regarding every nth execution flow. This approach is problematic because it omits a significant amount of data and, if a particular execution flow instance is not selected for sampling, all information about it is lost. Thus, if a particular component is executing unusually slowly, for instance, but only on an irregular basis, this information may not be captured.

Another approach, aggregation, involves combining information from all execution flows into a small enough data set that can be reported. For example, assume there are one thousand requests to an application server. For each execution flow, performance data such as the response time can be determined. Information such as the slowest, fastest, median and mean response times can then be determined for the aggregated execution flows. However, aggregating more detailed information about the execution flows is more problematic since the details of the execution flows can differ in various ways. Moreover, a mechanism has not been available for aggregating information between related execution flows, such as at different computer systems.

It would be desirable to provide a technique for monitoring execution flows which addresses the above and other issues.

SUMMARY OF THE INVENTION

A technique is provided for monitoring execution flows, in which information regarding the execution flows is aggregated to reduce the amount of data which is needed to represent the information. The aggregation combines the information from all execution flows into a small enough data set that can be reported without consuming unduly large processing overhead while still preserving as many of the interesting aspects of the execution flows as possible.

In one embodiment, a computer-implemented method for monitoring execution flows includes providing a number of execution flow shapes, and aggregating data from respective execution flows at one or more computer systems by categorizing each respective execution flow into a corresponding execution flow shape selected from the available execution flow shapes. The aggregated data may be subsequently communicated to a manager application for subsequent user, while the raw data from each execution flow is discarded after the execution flow is categorized. The aggregated data can indicate a quantity of the execution flows which were categorized into each of the execution flow shapes, while also providing aggregated performance data associated with each of the execution flow shapes, such as the slowest, fastest, median and mean execution times of the execution flows which were categorized into a given execution flow shape. Any other type of statistical measure may be used as well.

The execution flow shape is essentially a profile of an execution flow and may represent, e.g., a sequence of software components which are invoked by an execution flow, or a sequence of resources which are consumed by an execution flow. One example of an execution flow is a transaction. An execution flow can be categorized by determining which respective sequence of software components represented by the execution flow shapes is closest to an observed sequence in which software components are invoked, or resources are consumed, by the execution flow. Furthermore, an execution flow may span one or more threads and/or processes. The execution flow shapes allow interactions between the components to be discerned while facilitating the identification of specific problematic components. Targeted steps can then be taken by the appropriate personnel to resolve any problems. Furthermore, the aggregated data can be obtained separately at multiple computer systems and reported to a central manager for analysis, thereby further facilitating analysis and trouble-shooting across enterprise applications.

BRIEF DESCRIPTION OF THE DRAWINGS

FIG. 9 depicts the formation of an execution flow shape, based on the call stack depth versus time representation of FIG. 6a.

FIG. 10 depicts a method for defining execution flow shapes.

FIG. 11 depicts a method for aggregating execution flow data.

DETAILED DESCRIPTION

Figure 1:
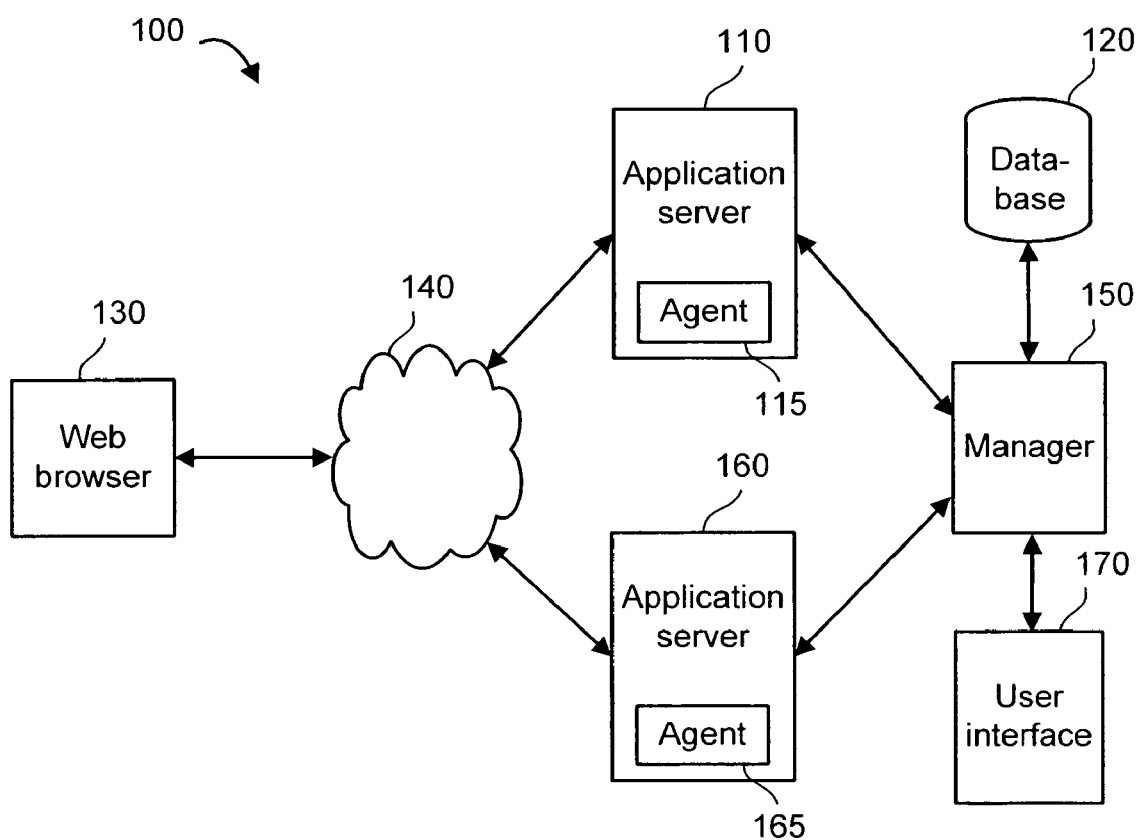
FIG. 1 depicts a network in which different computer systems provide aggregated data to a manager.

In managing an application, there is a tension between providing high-level data which is easy to understand and provides minimal overhead as far as processing and memory resource usage is concerned, and the need to provide detailed information which enables drilling-down to the component level to diagnose problems when they occur. Thus, instead of just collecting one set of data for an entire execution flow, it would be desirable to collect data for each component that is involved in an execution flow, for each execution flow that occurs. However, there is typically too much data to report information for every component involved in every execution flow, especially for enterprise applications which perform numerous execution flows, e.g., sometimes millions per hour.

One approach, sampling, involves selecting a subset of the data to report. For example, to avoid the need to maintain excessive overhead data, data regarding only a small number of individual execution flows may be reported. This approach is problematic because it omits a significant amount of data and, if a particular execution flow is not selected for sampling, all information about it is lost.

Aggregation is more promising since it involves combining information from all execution flows into a small enough data set that can be reported. While this approach does not provide all details, it does incorporate information from every execution flow and therefore provides more complete results than with sampling. However, heretofore, aggregating such detailed information was problematic since the details of the execution flows can differ in various ways. For example, different execution flows can invoke different sequences of components and can diverge from other similar execution flows at any point. An execution flow generally refers to any type of processing at a computer system, such as a server. For example, an execution flow can be initiated in response to a request, and can include processing involving one or more processes, and/or one or more threads. An execution flow can include a single request/response pair. Further, an execution flow can include a transaction, such as a group of logical operations that succeed or fail as a group. An execution flow can include a sequence of resources which are consumed. Generally, an execution flow can involve one or more methods, processes, procedures, functions, threads or sets of instructions or the like for performing a task. In the Java environment, for instance, an execution flow can include a method invocation in a running software system that enters and exits a JAVA™ Virtual Machine (JVM™) (a type of virtual machine), and everything the JVM™ calls.

Aggregation of detailed execution flow data can be performed in a meaningful way using the techniques provided herein. In particular, information about execution flows can be aggregated using the concept of an "execution flow shape" which can refer to, e.g., an ordered sequence of components which are invoked by an execution flow, or, more generally, a sequence of resources that are consumed at one or more computer systems. Furthermore, a component can be defined to represent a balance between the amount of data collected and the associated processing and/or memory overhead. For instance, a component can range from only a top level component involved in an execution flow down to individual methods or even a subset of a method (e.g., a particular loop) depending on the amount of data desired.

FIG. 1 provides a network 100 in which different computer systems provide aggregated data to a manager. Example computer systems 110 and 160 may include application servers or any other type of computer system having a processor for executing code to achieve a desired functionality. The computer systems can be located remotely from one another or co-located. In the example provided, the computer systems 110 and 160 are co-located, and communicate with a local manager computer 150. For example, a corporation running an enterprise application such as a web-based e-commerce application may employ a number of application servers at one location for load balancing. Requests from users, such as from an example web browser 130 of a user, are received via a network cloud 140 such as the Internet, and can be routed to either of the computer systems 110 or 160. The web browser 130 typically accesses the network cloud 140 via an Internet Service Provider, not shown. Agent software running on the computer systems 110 and 160, denoted by agents 115 and 165, respectively, gathers information from an application, middleware or other software, running on the respective computer systems 110 and 160, in one possible approach. For example, such information may be obtained using instrumentation such as byte code instrumentation. However, the gathered data may be obtained in other ways as well. The agents essentially live in the system being monitored and provide a data acquisition point. The agents organize and optimize the data communicated to the manager 150.

Various approaches are known for instrumenting software to monitor its execution. For example, tracing may be used to track the execution of software. One example of tracing is discussed in U.S. Patent Application Publication No. 2004/0078691, titled "Transaction Tracer", published Apr. 22, 2004, incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application. The agent software receives information from the probes and may communicate the information to another process, such as at the manager 150, or process the information locally, such as to determine whether the information indicates an abnormal condition. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents 115 and 165 are typically aware of the software executing on the local computer system 110 and 160, respectively, with which they are associated.

The manager 150 can be provided on a separate computer system such as a workstation which communicates with a user interface 170, such as a monitor, to display information based on data received from the agents 115 and 165. The manager 150 can also access a database 120 to store the data received from the agents 115 and 165. In the example provided, the computer systems 110 and 160 can communicate with the manager 150 without accessing the network cloud 140. For example, the communication may occur via a local area network. In other designs, the manager 150 can receive data from the agents of a number of computer systems via the network cloud 140. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 150 and user interface display 170 might be provided at a corporate headquarters location. Other applications which are not necessarily web-based or involve retail or other sales, similarly employ agents and managers for managing their systems. Moreover, in addition to the multi-computer system arrangements mentioned, a single computer system can be monitored as well with one or more agents.

Figure 2:
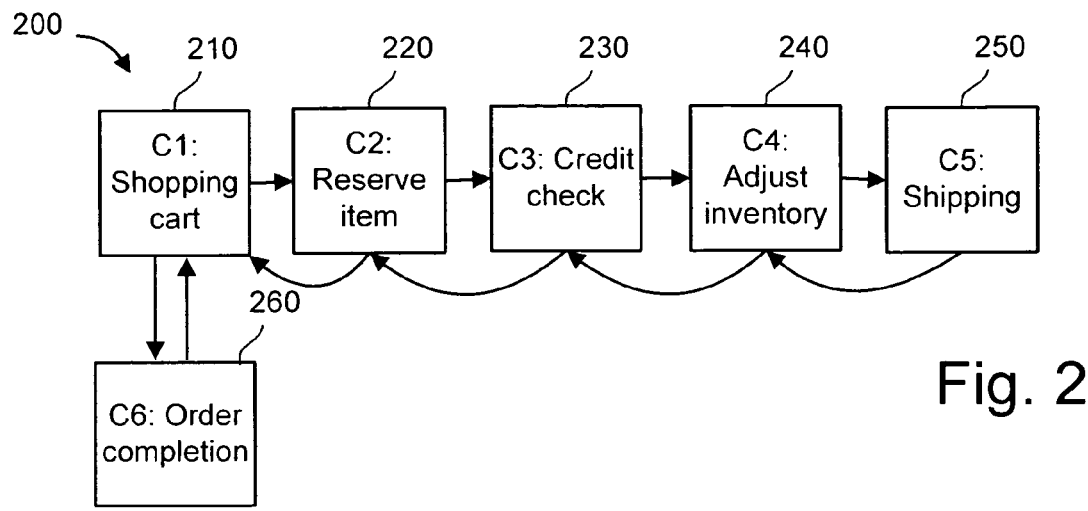
FIG. 2 depicts an example sequence of components invoked in a transaction.

FIG. 2 depicts an example sequence of components invoked in a transaction. A sequence of components is provided herein as an example of one possible type of execution flow. Component oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. The components are examples of resources in a computer system that are consumed, or work that is done, when a program executes. One example of a component oriented programming model is J2EE™, which can employ components such as a JAVA™ Server Page (a type of web page), an ENTERPRISE JAVA BEAN™ (a type of software component in an enterprise application), a servlet, and a JAVA™ Database Connectivity component (a type of software component in a database). However, other component oriented programming models may also be used. Moreover, the programming model need not be object oriented.

The specific example shown refers to a web-based e-commerce application which allows users to order items. As can be seen, the components may correlate with business logic or e-commerce steps in the application. Together, the components comprise an execution flow such as a transaction 200. A component C1 (210) provides a shopping cart which allows a user to select an item to purchase and to enter information such as the payment method, e.g., type of credit card and credit card number, and the shipping information, e.g., the address to which the item is to be shipped and the method of shipping, e.g., ground delivery or overnight air delivery. The component C1 (210) calls a component C2 (220), which reserves the item which the user wishes to purchase. This is done so that the item will not be sold to another user while the transaction is still pending. Once finished, the component C2 (220) calls a component C3 (230), which checks the user's credit card information to authorize and validate the purchase. This typically involves communicating with an external server that is managed by a credit card clearinghouse. Once the component C3 (230) successfully finishes, thereby approving the purchase, the component C3 (230) calls a component C4 (240) which adjusts an inventory by decrementing the quantity of the item purchased. The component C4 (240) calls a component C5 (250) which arranges for the item to be shipped, such as by contacting a warehouse, where a shipping label is printed and an operator is prompted to manually locate and pack the item. Once the components C2-C5 have executed, program control returns to the component C1 (210), which calls an order completion component C6 (260) to confirm the purchase to the user such as by providing an order confirmation number and a tracking number, e.g., in a confirmation e-mail and web page. In one possible implementation, C1 and C6 are JAVA™ Server Pages and C2-C5 are ENTERPRISE JAVA BEANS™.

Note that a first component can continue executing after calling another component, which begins executing, in an asynchronous, multi-thread or multi-process mode, or can temporarily pause until the called component has finished executing, in a synchronous, single-thread or single-process mode. For example, the component C1 (210) can pause while the components C2-C5 execute. Moreover, a given component may be invoked more than once during a transaction. For example, assume the user has purchased multiple items that are stored at different warehouses. In this case, the component C5 may execute repeatedly, contacting a different warehouse each time.

Figure 3:
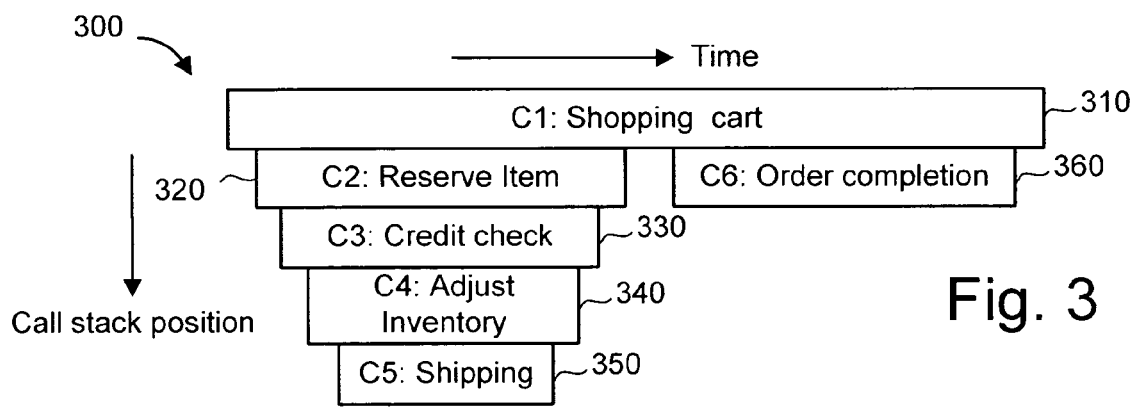
FIG. 3 depicts an example call stack depth versus time representation of a sequence of components invoked in a transaction, based on the sequence of components of FIG. 2.

FIG. 3 depicts an example call stack depth versus time representation of a sequence of components invoked in a transaction, based on the sequence of components of FIG. 2. The horizontal direction represents time, while the vertical direction indicates call stack depth or position. A call stack identifies components which have been called or invoked during the execution of one or more programs or threads. In the graphical representation 300, which can be provided on a user interface display, for instance, component C1 (310) is the first or root component of the call stack. Components C2 (320) and C6 (360) are at a second layer of the call stack, and components C3 (330), C4 (340) and C5 (350) are at third through fifth layers, respectively, of the call stack. After C1 begins to execute, at the start of a transaction, C2 is called. After C2 begins to execute, C3 is called. After C3 begins to execute, C4 is called. After C4 begins to execute, C5 is called. After C5, C4, C3, and C2 successively finish executing, C1 calls C6. After C6 finishes executing, C1, and the transaction, finish executing.

Note that the execution flow can alternatively be represented by start and finish nodes. For example, each component in a transaction or other execution flow can be considered to have a start node and a finish node. The ordering of nodes in a transaction denotes the calling relationship between them. For example, if a first component starts followed immediately by the start of a second, we interpret that as the first component calling the second component. Alternatively, if the first component starts and then finishes and then the second component starts, the first and second components have a sibling relationship and were called by a single parent component.

Figure 4:
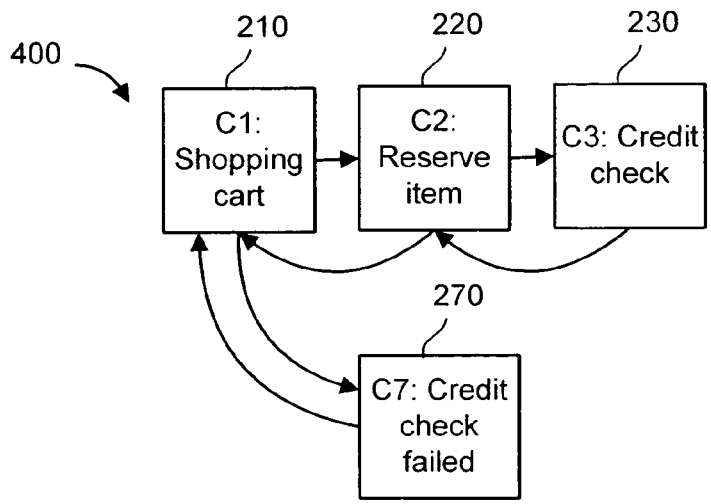
FIG. 4 depicts an example sequence of components invoked in a transaction, where a credit check fails, based on the sequence of components of FIG. 2.

FIG. 4 depicts an example sequence of components invoked in a transaction, based on the sequence of components of FIG. 2, where a credit check fails. The transaction 200 of FIG. 2 may not necessarily result each time the component C1 executes. For example, in the transaction 400, the component C3 (230) is unsuccessful in authorizing and validating the purchase, e.g., because the credit card is over its limit or has expired, or because the external server that is managed by a credit card clearinghouse is temporarily unavailable. In this case, when control of the program returns to the component C1 (210), the component C1 (210) calls a component C7 (270), which can perform an action such as displaying an appropriate message to the user via a web page and/or logging the incident as an event.

Figure 5:
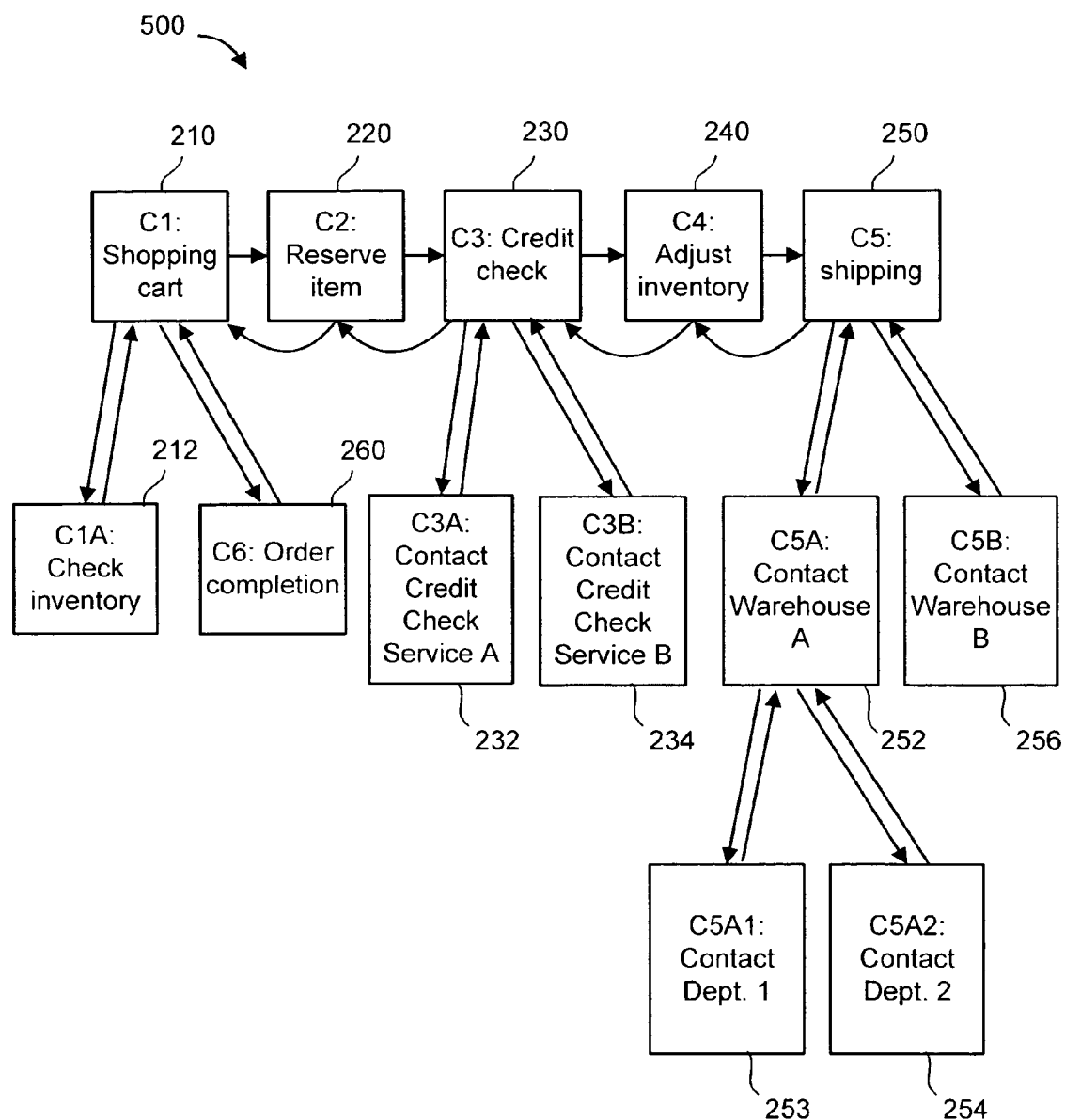
FIG. 5 depicts an example sequence of components which can be invoked in a transaction, showing further details regarding additional components of the sequence of components of FIG. 2.

FIG. 5 depicts an example sequence of components which can be invoked in a transaction, showing further details regarding additional components of the sequence of components of FIG. 2. In the sequence 500, the sequence 200 of FIG. 2 is extended to show further details of components which can be called by other components. An additional component which can be called by component C1 (210) includes a component C1A (212), which checks an inventory to determine if an item is in stock. The transaction can then proceed with C1 calling C2 once this is confirmed. Additional components which can be called by component C3 (230) include a component C3A (232) which contacts a credit check service A, and a component C3B (234) which contacts a credit check service B. These different components illustrate that multiple layers of complexity may be present in a transaction. In the example shown, different credit check services may be accessed to verify and authorize a payment by credit card. For instance, a specific credit check service may be accessed based on the type of credit card used. Or, different credit check services may be accessed for load sharing so that a given service is not overwhelmed.

Similarly, additional components that can be called by component C5 (250), the shipping component, include a component C5A (252) which contacts a warehouse A, and a component C5B (256) which contacts a warehouse B. For instance, a specific warehouse may be contacted depending on the item ordered or on the buyer's address. Furthermore, the component C5A (252) may in turn contact different departments in the warehouse where the specific item is located, as exemplified by the component C5A1 (253), which contacts a first department, and a component C5A2 (254), which contacts a second department. For instance, the components may cause an on-screen message to be displayed to warehouse personnel in the department, who respond by locating and packing the item. Various other examples will be apparent to those skilled in the art.

Figure 6A:
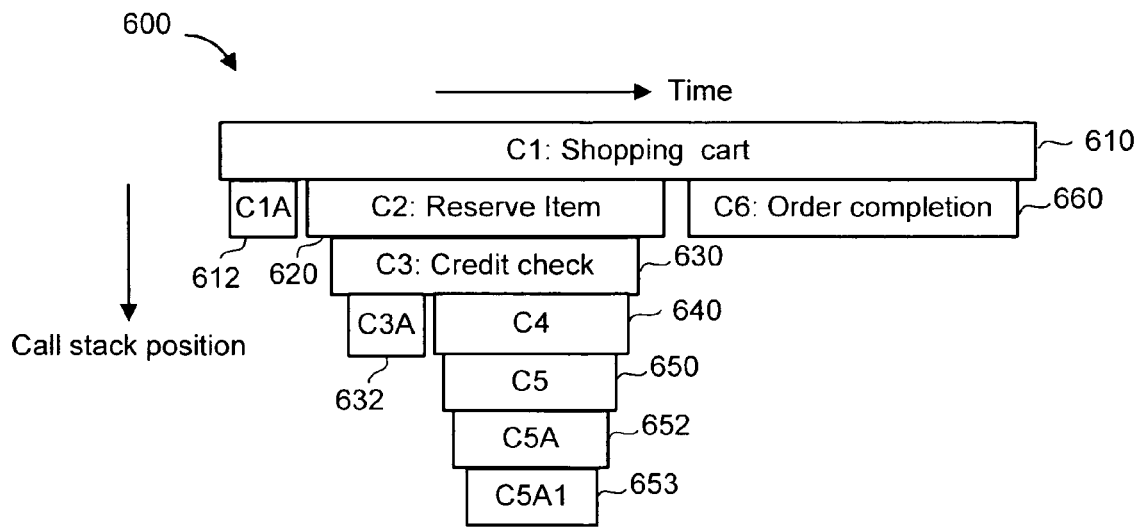
FIG. 6a depicts an example call stack depth versus time representation of a sequence of components invoked in a transaction, based on the sequence of components of FIG. 5.

FIG. 6a depicts an example call stack depth versus time representation of a sequence of components invoked in a transaction, based on the sequence of components of FIG. 5. In particular, the representation indicates one possible execution flow through the components of FIG. 5. As before, the horizontal direction represents time, while the vertical direction indicates call stack depth. In the graphical representation 600, component C1 (610) is the first or root component of the call stack. Components C1A (612), C2 (620) and C6 (660) are at a second layer of the call stack, C3 (630) is at a third layer of the stack, C3A (632) and C4 (640) are at a fourth layer of the stack, C5 (650) is at a fifth layer of the stack, C5A (652) is at a sixth layer of the stack, and C5A1 (653) is at a seventh layer of the stack. After C1 begins to execute, at the start of a transaction, C1A is called. After C1A finishes executing, C1 calls C2. After C2 begins to execute, C3 is called. After C3 begins to execute, C3A is called. After C3A finishes executing, C3 calls C4. After C4 begins to execute, C5 is called. After C5 begins to execute, C5A is called. After C5A begins to execute, C5A1 is called. After C5A1, C5A, C5, C4, C3 and C2 successively finish executing, the execution flow returns to C1, which calls C6. After C6 finishes executing, C1, and the transaction, finish executing.

Figure 6B:
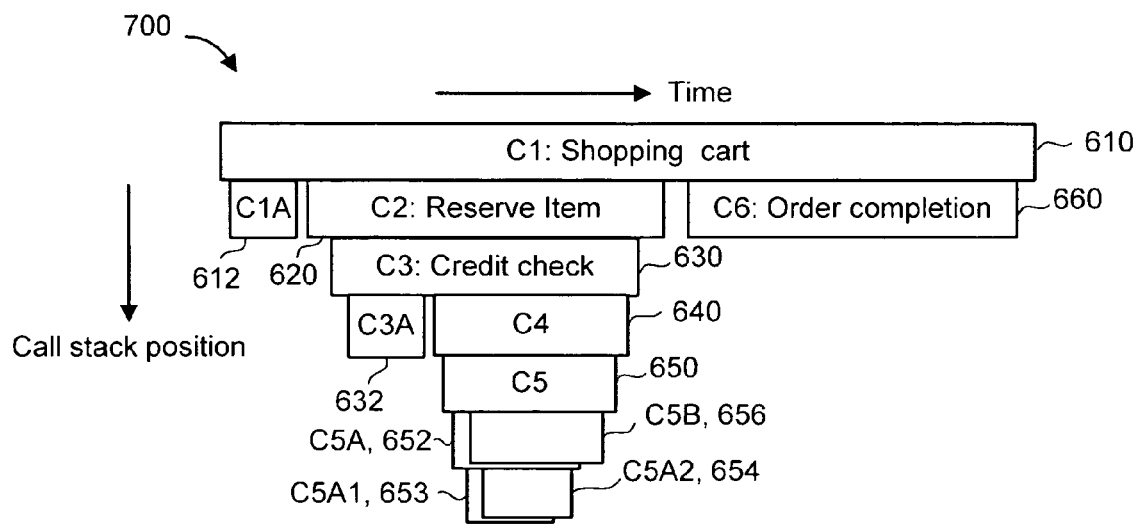
FIG. 6b depicts an example call stack depth versus time representation of a sequence of components invoked in a transaction, based on the sequence of components of FIG. 5, where multi-threaded processing is performed.

Note that while a synchronous execution flow is provided in the example of FIG. 6a, multi-threaded execution flows may also be used. For example, FIG. 6b depicts an example call stack depth versus time representation of a sequence of components invoked in a transaction, based on the sequence of components of FIG. 5, where multi-threaded processing is performed. The graphical representation 700 differs from the graphical representation of FIG. 6a in that the execution of component C5A (652) and C5B (656) is overlapping. Additionally, the execution of components C5A1 (653) and C5A2 (654) is overlapping. Referring also to FIG. 5, this scenario may result, for instance, if multiple items that are being purchased are located in warehouse A, departments 1 and 2, and in warehouse B. In this case, the shipping component C5 (250) may call both components C5A (252) and C5B (256) at the same time, or at least at overlapping times, and component C5A (252) may call both components C5A1 (253) and C5A2 (254) at the same time, or at overlapping times.

Execution Flow Shapes

As discussed, a large number of different execution flows such as transactions can occur at a computer system depending on specific sequences of components which are called or resources which are consumed, for instance. Generally, when code is instrumented, the specific execution flows that will be generated at runtime are not known. For a given application, such as a web application with which a user interacts, there will be a finite number of execution flows that can be performed. However, each execution flow can differ, slightly or substantially, in factors such as: which components or other resources are executed, the number of times they are executed, the order in which they are executed, membership and count. While it is theoretically possible to store information regarding each possible different execution flow at a computer system for reporting via a user interface, for instance, this is impractical because it consumes too much processing overhead. Moreover, the information obtained would not be in a useful form which could be readily grasped.

An execution flow shape can be provided which captures relevant information regarding execution flows while discarding unimportant information. The execution flow shape can be obtained by observing different execution flows and performing a lossy compression process using compression/normalization rules, described further below. Once the execution flow shapes are defined, the execution flows used to define the execution flow shape, as well as subsequent execution flows, are categorized into one of the available shapes. Information regarding the quantity of execution flows that are categorized into each shape can also be maintained, along with aggregated performance and other data. For instance, a slowest, fastest, median and mean execution time for each component or other resource in an execution flow shape can be maintained. Other statistical metrics such as standard deviation, variance and the like can also be determined. Essentially any type of statistical measure can be used to characterize the aggregated data.

Thus, in one possible approach, the execution flow shapes can be defined in a first step, and the execution flows subsequently aggregated and categorized in a distinct second step. However, it is also possible to perform both steps on the fly, e.g., by observing an execution flow and either categorizing it into an existing shape or generating a new shape. For example, a given execution flow can be observed and categorized before all of the execution flows have been observed.

Furthermore, compression can be used to minimize the number of execution flow shapes that are generated by reducing each execution flow to a simplified form which has the least number of components, while avoiding the loss of data about important components. Furthermore, the compression can be applied while an execution flow is executing or after the execution flows has finished executing. Additionally, to avoid data sampling, agent-side aggregation can be performed for execution flow data with equal execution flow shapes. By minimizing the number of execution flow shapes generated and aggregating execution flow data on the agent, the memory required by the agent, and the bandwidth required to report the data collected, are minimized.

Loop Compression

One compression rule which may be employed involves treating multiple iterations of a loop as a single iteration. A loop includes a repeated sequence of components in an execution flow. Looping allows the sequence of components to be called multiple times consecutively. Loop compression allows automatic detection of loops such that generated execution flow shapes do not contain multiple equal iterations of a single loop.

Figure 7:
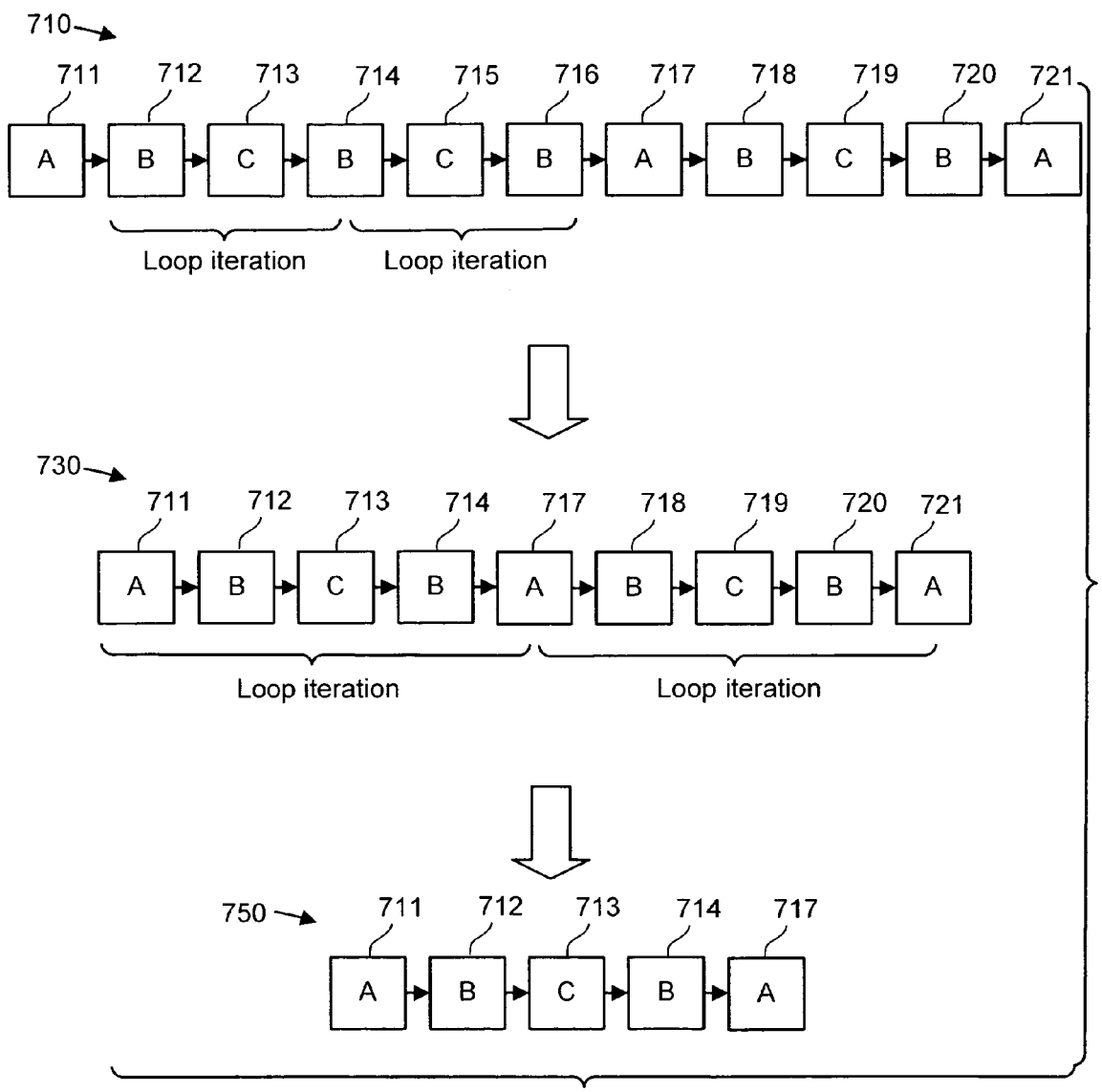
FIG. 7 depicts components involved in loop compression.

FIG. 7 depicts components involved in loop compression. The use of components is an example of resources that may be consumed at a computer system. The component sequence 710 indicates a control or execution flow through a number of components 711-721 which are invoked, e.g., in a sequence formed by component A (711), component B (712), component C (713), component B (714), component C (715), component B (716), component A (717), component B (718), component C (719), component B (720) and component A (721). In further detail, the sequence 710 represents the following ordered set of component starts and finishes:

1. Start component A (711)
2. Start component B (712)
3. Start component C (713)
4. Finish component C (713)
5. Finish component B (714)
6. Start component B (714)
7. Start component C (715)
8. Finish component C (715)
9. Finish component B (716)
10. Finish component A (717)
11. Start component A (717)
12. Start component B (718)
13. Start component C (719)
14. Finish component C (719)
15. Finish component B (720)
16. Finish component A (721)

The loop compression technique involves recognizing loops formed by repeated iterations of sequences of components. For instance, in the sequence 710, the sequence of B-C-B appears twice. The first iteration involves components 712-714, while the second iteration involves components 714-716. The multiple iterations are collapsed by replacing them with a single iteration, as indicated by the sequence 730, in which the single iteration is provided by components 712-714. Additionally, in the sequence 730, the sequence of component A-B-C-B-A appears twice. The first iteration involves components 711-717, while the second iteration involves components 717-721. The multiple iterations are collapsed by replacing them with a single iteration, as indicated by the sequence 750.

Thus, the loop compression may operate by identifying and collapsing the inner most nested loop or loops in an execution flow first, then working progressively outward, one level at a time, until any intermediate loops are identified and collapsed, and finally, the outermost loop is identified and collapsed. For instance, in the sequence 710, the inner loop was formed by the two iterations of B-C-B, while the outer loop was formed by two iterations of A-B-C-B-A. Generally, the loop compression process may operate by assuming that a selected component, such as the first component, is a loop start component, e.g., the first component of a loop. Note that components which are of a type which cannot be part of a loop need not be selected as potential loop start components. The subsequent execution flow can then be analyzed to determine whether it is inconsistent or consistent with the assumption. For example, an execution flow which transitions from a first component to a second component and back to the first component, then to the second component again and back to the first component, represents a loop. If the execution flow is not consistent with the assumed loop start component, a new loop start component is selected and the subsequent execution flow is again analyzed to determine whether it is inconsistent or consistent with the assumption. The procedure can be repeated until no further potential start components can be identified.

For example, the process can start by assuming that component A (711) is a loop start component. The execution flow starting at component A (711) is observed until other occurrences of component A, e.g., components 717 and 721, are located. The sequences between these components are potentially iterations of a loop because a loop starts and stops on the same component type. The components which are intermediate to the components 711, 717 and 721 are then examined.

For example, when component C (715) is reached, it can be concluded that the sequence A-B-C-B-C between components 711 and 715 is not an iteration of a loop. This is true because the execution flow A-B-C-B would have to be followed by A, not C, to form a loop. Thus, the hypothesis that component A (711) is a loop start component of a loop where components 717 and 721 represent ends points of iterations of the loop is incorrect. Component A (711) can be marked accordingly, e.g., by maintaining data indicating that component A (711) is not a loop start component of such a loop.

A new hypothesis is developed in which another component is assumed to be a loop start component of another loop, such as component B (712). The execution flow starting at component B (712) is observed until other occurrences of component B, e.g., components 714, 716, 718 and 720, are located. The execution flow starting at component B (712) is observed until component 714 is reached, at which time it can be concluded that the sequence B-C-B between components 712-714 forms an iteration of a loop. The execution flow starting at component B (714) is then observed until another occurrence of component B, e.g., component 716, is located, at which time it can be concluded that the sequence between components 714-716 forms a second iteration of the loop. The execution flow starting at component B (716) is then observed until another occurrence of component B, e.g., component 718, is located, at which time it can be concluded that the sequence B-A-B between components 716-718 does not form a third iteration of the loop. The sequence of components between components 712 and 716 can thus be collapsed into two iterations of the sequence of B-C-B which is represented by components 712, 713 and 714, in the sequence 730.

Applying the above-described loop compression process again to the sequence 730, component A (711) is again identified as a potential loop start component in a loop where components 717 and 721 potentially represent the ends of iterations of the loop. The execution flow starting at component 711 is observed until component 717 is reached, at which time it can be concluded that the sequence between them forms an iteration of the loop. The subsequent execution flow after component 717 is observed until component 721 is reached, at which time it can be concluded that the sequence between them forms a second iteration of the loop. The two sequences of components 711-717 and 717-721 can thus be collapsed into the single sequence of A-B-C-B-A, in the sequence 750. In further detail, the sequence 750 represents the following component execution starting and finishing sequence:

1. Start component A (711)
2. Start component B (712)
3. Start component C (713)
4. Finish component C (713)
5. Finish component B (714)
6. Finish component A (717)

Furthermore, the loop compression can take place while an execution flow is in process. In practice, an execution flow can be represented by start and finish nodes. If a component being started has already been added to the execution flow in a place that could start a loop, an execution pointer is moved back to that node and marked as being in a loop, saving the start and end indices. Subsequent components added must follow the same sequence as the already tracked loop, allowing for inner loops. If the loop start component chosen was incorrect, there is a divergence, and a loop divergence handling can be performed to unroll the loop and adjust the execution flow to deal with the divergence. Nested loops are tracked and nested loop divergence can be handled where a divergence in a nested loop causes an outer loop to diverge as well.

Figure 8:
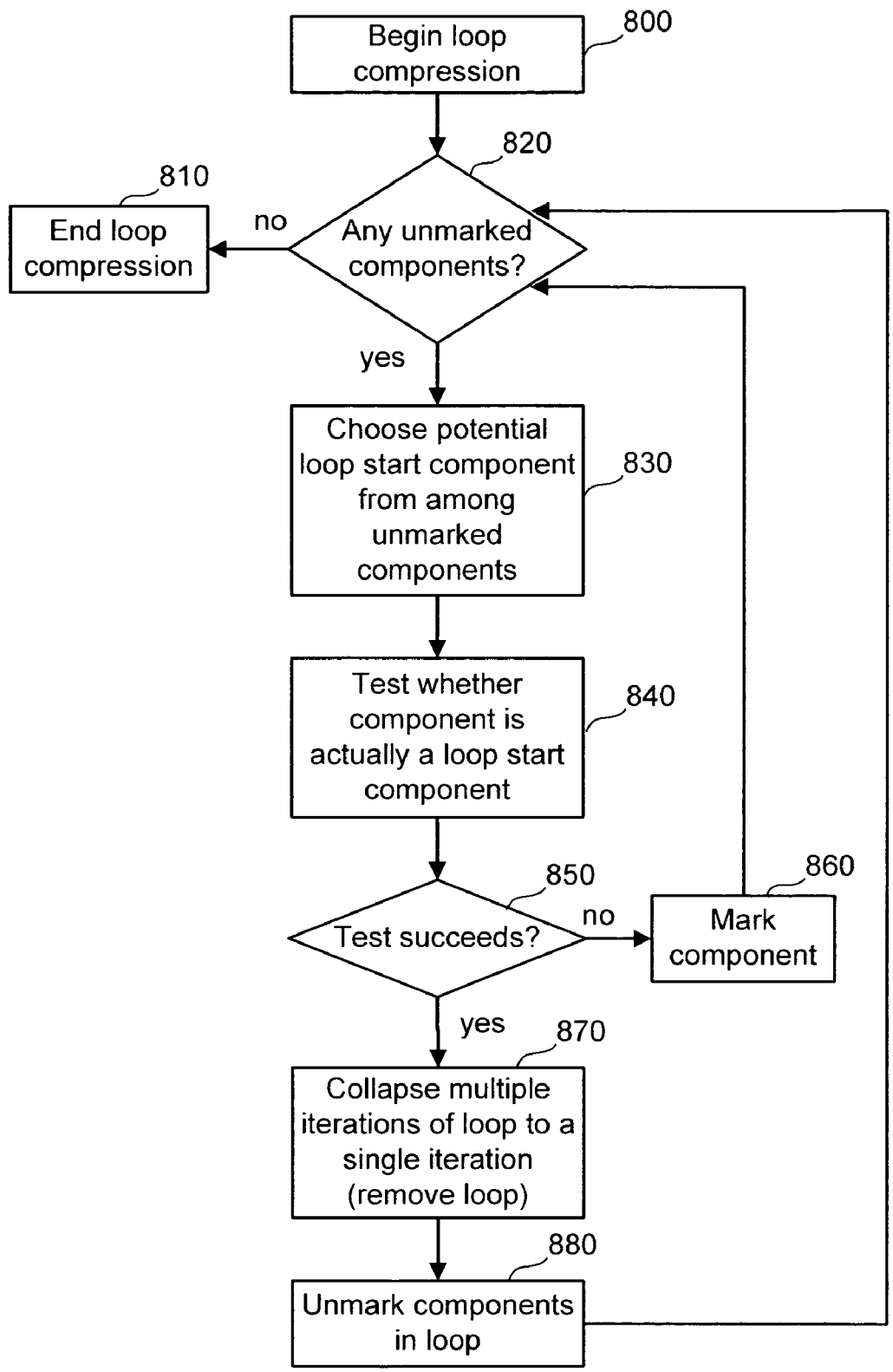
FIG. 8 depicts a loop compression method.

FIG. 8 depicts a loop compression method. The above-described loop compression technique can be summarized as follows. The loop compression process begins at step 800. At step 820, a determination is made as to whether there are any unmarked components. All components are initially unmarked. A component is subsequently marked if it is not a loop start component. If there are no unmarked components, the loop compression process ends, at step 810. If there are any unmarked components, a potential loop start component is chosen from among the unmarked components at step 830. This can be the first component in an execution flow, for instance. At step 840, a test is performed to determine whether the component is actually a loop start component, e.g., using the approach described previously. At step 850, if the test succeeds, it can be concluded that the potential loop start component is actually a loop start component, and the execution flow which was observed to arrive at this conclusion includes at least first and second iterations of a loop. At step 870, the multiple iterations of the loop are collapsed into a single iteration, thereby removing the loop. Note that the collapsing may occur after two or more iterations are identified. At step 880, any marked components in the loop are unmarked so that they may be candidate loop start components for other loops. On the other hand, at step 850, if it is concluded that the potential loop start component is not actually a loop start component, the component is marked at step 860 so that it will not subsequently be considered as a potential loop start component.

Once the control flow returns to step 820, if there are remaining unmarked components to test, a new potential loop start component is chosen from among the unmarked loop start components at step 830, and steps 840 and 850 are repeated. Thus, the unmarked components are examined until a loop start component is identified or there are no remaining unmarked components to test.

Component Skipping

A further compression rule which may be employed involves ignoring components which have a specified granularity. The rule, referred to as Component Skipping, allows certain components to be set as markers such that no components will be added to the execution flow until the marked component finishes. The marked component itself is not added to the execution flow either, although an alternative approach allows the marked component to be added. This allows uninteresting parts of execution flows to be excluded, thereby simplifying execution flow shapes. For example, when a component to be skipped starts executing, a flag may be set to ensure that no components or data are added to the execution flow until the component finishes executing.

In one possible approach, the rule can involve ignoring components that have a specified call stack depth. As an example, assume it is desired to ignore components at the fifth or higher level of the call stack. Referring to FIG. 6a, for instance, under this rule, components C5, C5A and C5A1 are ignored. The loss of information at the specified call stack depth can be considered to be an acceptable compromise between the need to obtained detail information regarding execution flows and the need to avoid excessive overhead processing costs. Essentially, in this example, it is decided that the granularity of the information provided by the components C5, C5A and C5A1 is too fine to track.

Optional Component Inclusion

Components are generally added to the execution flow shape the first time they are invoked. However, certain components can be marked such that they are added the first time they are invoked but are only optionally added afterwards. For example, a component will be reached more than once if it is part of a loop. This approach allows multiple iterations of a loop to be treated as the same sequence of components when the specified component occurs in only the first iteration of the loop, such as to perform an initialization function, but not in subsequent iterations. This can be implemented, e.g., by marking optional components and saving that state at runtime. When a component is executed, if it is in a loop, a check can be made to determine if the tracked component is optional. If it is optional, then the component being executed can either correspond to the optional component or the subsequent tracked component. If it corresponds to neither, then there is a loop divergence.

An execution flow having the optional component can be classified into the same execution flow shape as an otherwise similar execution flow. For instance, a given component CG may call an optional initialization component C1 when the given component executes for the first time, but not for subsequent times. In this case, CG is treated the same as CG followed by C1 in determining the execution flow shape.

Recursive Duplicate Component Handling

In an execution flow, a component may recursively call itself. In this case, there is no need to add additional nodes to the execution flow shape, so direct recursive component calls can be automatically compressed any into a single pair of start and finish nodes in the execution flow shape. This can be achieved by saving a stack of components in the execution flow, each with a count of the number of times the component has been recursively started. When a component is started, if it is the top component on the stack, then the count is incremented and the component is not added to the execution flow. If it is not the top component on the stack, then the component is added to the execution flow and pushed onto the stack with the count set at one. When a component finishes executing, it must be at the top of the stack. If its count is one, then the component is removed from the execution flow and popped from the top of the stack. Otherwise, the count is decremented.

This approach involves ignoring recursive or internal calls by a component to itself, and only considering external calls to other components, based on the assumption that calls within a component are too detailed to capture compared to external calls. Various other compression rules may be developed heuristically as will be apparent to those skilled in the art.

In addition to compression, techniques may be implemented for limiting maximum memory usage on the monitored computer system. These techniques can be used, e.g., in systems that have too many different execution flows that cannot be compressed or execution flows that are too big to track. One such technique involves limiting the number of components in an execution flow. During an execution flow, the number of non-looped components added to the execution flow shape is tracked. If a configurable limit is reached, no further nodes are added to the execution flow shape, all subsequent data to the last added node is reported, and the execution flow is marked as having reached the limit. The number of execution flows tracked can also be limited. This situation is handled similarly to the case above, but no further nodes are added when a configurable total node limit for all execution flows tracked on the agent is reached. A further technique involves aging out old execution flow shapes so that execution flow shapes which appear infrequently or only once, due to application behavior changes, for instance, are automatically deleted at the agent.

Figure 9:
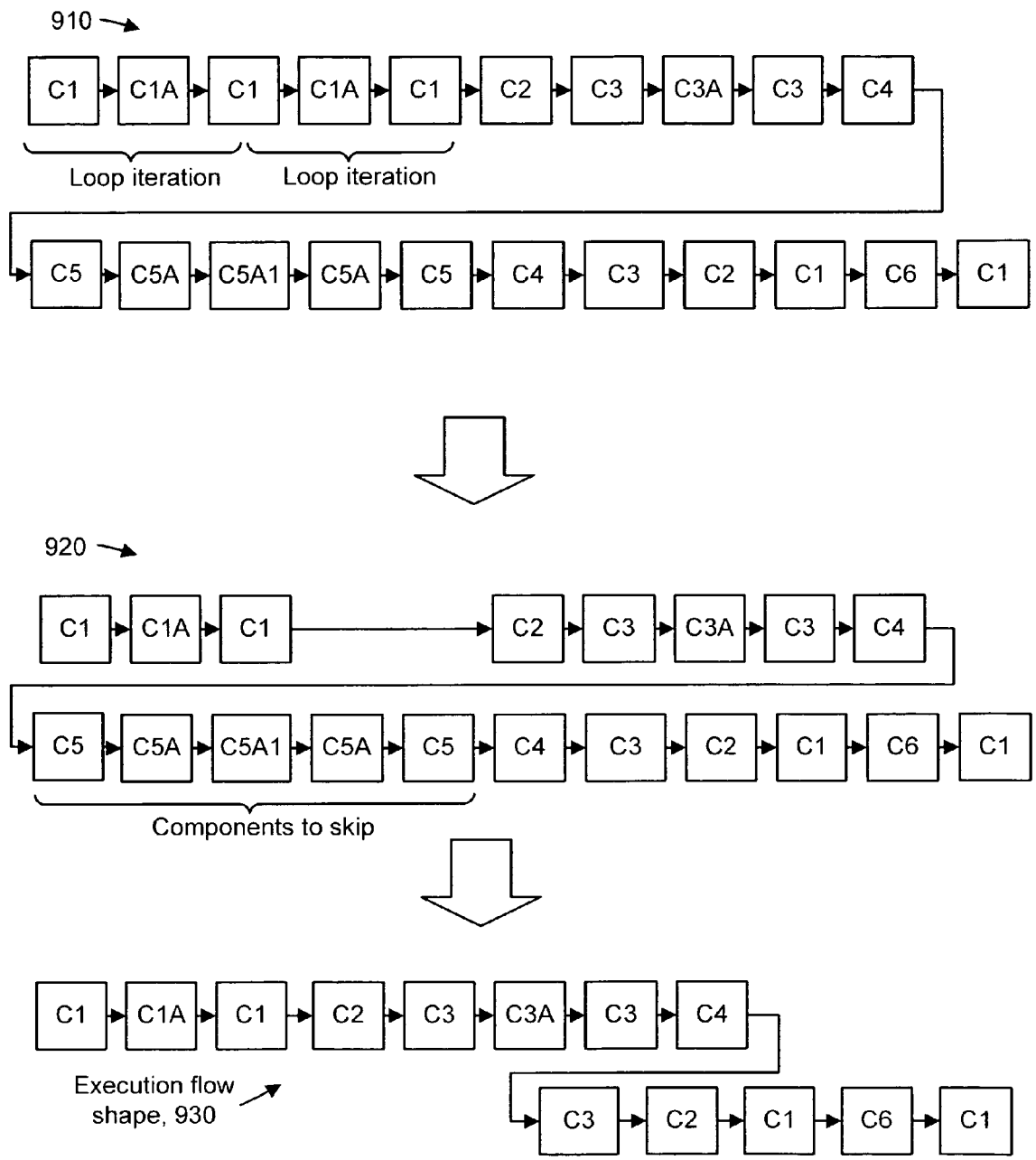

FIG. 9 depicts the formation of an execution flow shape, based on the call stack depth versus time representation of FIG. 6a. In particular, the depiction shows an execution flow but without showing depth. The example provided implements some of the compression techniques discussed above to illustrate how execution flows can be compressed to a more compact form. The execution flow 910 is provided for a sequence of components which are invoked, e.g., a raw data sequence, before compression. In the example shown, referring also to FIG. 5, C1 calls the component C1A in two iterations of a loop such that the execution flow proceeds from C1-C1A-C1-C1A-C1. This may occur, e.g., when the component C1 (210) calls the component C1A (212) to check an inventory for each item that is ordered. Using loop compression, the loop represented by C1-C1A-C1-C1A-C1 can be treated as C1-C1A-C1, resulting in the compressed sequence 920.

Furthermore, the Component Skipping compression rule may be employed on the sequence 920 by ignoring components which have a specified granularity. Using the example described previously, the rule can involve ignoring or skipping components that have a specified call stack depth, such as components at the fifth or higher level of the call stack. Referring also to FIG. 6a, for instance, under this rule, components C5, C5A and C5A1 are ignored, resulting in the further compressed sequence 930. In this case, the execution flow shapes will not include direct information regarding shipping of items. If no further compression is used, the sequence 930 may be taken as the defined execution flow shape. Other execution flows which are analogous to the execution flows 910 or 920 can similarly be categorized into the execution flow shape 930, while non-analogous execution flows are categorized into other execution flow shapes. In particular, each execution flow can be categorized into the closest matching available execution flow shape.

FIG. 10 depicts a method for defining execution flow shapes. At step 1000, software, such as an application or middleware, is monitored to extract information from the software as it executes. In one possible approach, described in the aforementioned U.S. Patent Application Publication No. 2004/0078691, bytecode of an application to be monitored is instrumented with probes. The instrumentation can be done dynamically, as the software executes, or statically, before the software executes. However, other approaches are also possible. Agent software receives the information obtained by monitoring and may communicate the information to another process, such as a manager, or process the information locally. At step 1010, the agent software, for instance, may observe execution flows which occur at the monitored computer system. For example, this may involve observing and recording sequences of invoked components, or other resources that are consumed, for each execution flow. At step 1020, the agent may apply the compression rules to each of the observed sequences to obtain corresponding compressed sequences. At step 1030, execution flow shapes are defined based on the compressed sequences and, at step 1040, the execution flow shapes are saved. Again, this may occur locally at a given computer system which is monitored or at another computer system which acts as a manager.

The agents may receive updated information from the manager or other entity from time to time which provides hints, e.g., as to how to best perform compression and/or matching of execution flows to the execution flow shapes. It is also possible for execution flow shapes that are defined on one computer system to be imported to one or more other computer systems. For example, multiple servers may be arranged in parallel for load sharing. As each server communicates the aggregated execution flow shape data to a central manager, the manager can periodically update specific servers with the execution flow shapes received from other servers. Or, the servers may communicate execution flow shapes directly to one another. In this manner, common execution flow shapes can be provided at each computer system. Moreover, the need for a learning period for defining execution flow shapes can be reduced or eliminated.

FIG. 11 depicts a method for aggregating execution flow data. Once a number of execution flow shapes have been defined and made available at a computer system, execution flow data can be aggregated, e.g., by an agent at the monitored computer system, by categorizing different execution flows into a corresponding execution flow shape which is a closest match. In one approach, the execution flows which were used to define the execution flow shapes can also be categorized into an execution flow shape. Subsequent execution flows can similarly be categorized into a corresponding one of the previously defined execution flow shapes. Additionally, subsequent execution flows can be monitored to determine whether to update the defined execution flow shapes such as by adding new shapes or deleting existing shapes which have not been used recently. This updating may occur automatically, as does the defining of the execution flow shapes.

At step 1100, the execution flows which are to be classified are observed and recorded. The observing may include monitoring the software, for instance, to determine when each component in the execution flow starts and finishes execution. At step 1110, compression rules are applied to the sequences of invoked components of the execution flows to obtain compressed sequences. At step 1120, for each execution flow, an execution flow shape is selected which is a closest match to the compressed sequence. The closest match can be determined in various ways, such as by using pattern recognition techniques which are known to those skilled in the art to compare the compressed sequence to different available execution flow shapes. For example, a distance metric may be calculated which represents how closely an execution flow matches each of the different shapes. The shape associated with the smallest distance is then selected as the most closely matching shape. It is also possible to use pattern recognition techniques to compare the raw execution flow sequence, without compression, to the execution flow shapes, and to determine the closest match.

Furthermore, data can be maintained indicating a quantity of execution flows which have been categorized into each execution flow shape, e.g., five execution flows into shape A, ten execution flows into shape B, and so forth. At step 1130, performance and other data associated with the execution flows can be stored and updated. For instance, data such as the execution start and stop times of an execution flow can be updated so that the slowest, fastest, median and mean execution times of the execution flows categorized into a given execution flow shape are stored. At step 1140, the raw and/or compressed execution flow data can be discarded, once the execution flow has been categorized, to free up memory resources. At step 1150, the aggregated execution flow shape, performance and other data can be provided to a manager for subsequent use, e.g., providing a user interface, storage, analysis and so forth. The other data may include resource data which includes, e.g., socket and file usage, database connections and so forth, and execution flow annotations, which may be, e.g., name/value pairs that relate to parameter values (e.g., user IDs), method return values, normalized SQL statements and other similar data collected during the execution flows. The number of iterations of a loop can also be indicated by the annotations. Moreover, each piece of annotative data can be associated with a component in the execution flow.

The aggregated execution flow shape and other data advantageously allows the user to quickly grasp the nature of the execution flows which are executing at a given computer system in a way that accounts for information from all execution flows yet does not provide an excessive amount of detail. Furthermore, visibility into the entire shape of an execution flow is provided so that cause-and-effect relationships between components can be ascertained.

Correlating Execution Flows on Different Processes or Threads

Figure 12A:
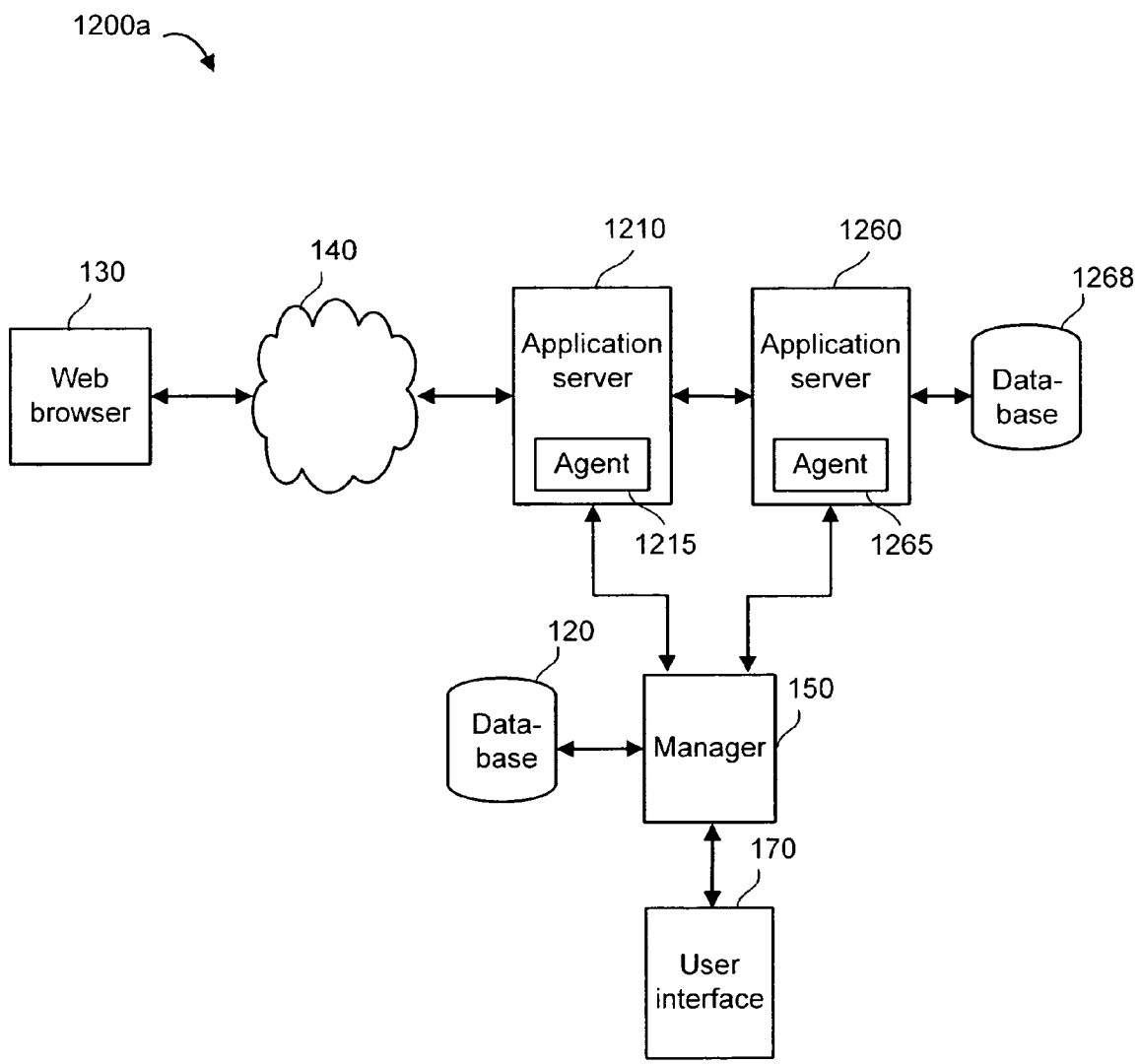
FIG. 12a depicts a network in which different computer systems provide related aggregated execution flow data to a manager.

FIG. 12a depicts a network in which different computer systems provide related execution flow data to a manager. In complex programs such as enterprise web applications, an execution flow at a given computer system may need to interact with one or more other computer systems. For instance, in the network 1200a, the application server 1210 may need to obtain information from the application server 1260 to fulfill a request made by a user at the web browser 130. Note that fulfilling a request is merely one example of essentially any type of action that can be performed by the application server 1210. The action need not include fulfilling a request or obtaining information.

However, in the example where the application server 1210 fulfills a request, the application server 1210 can send a request to the application server 1260 which, in turn, executes an execution flow for fulfilling the request. The application server 1260 itself may need to access an external source, such as a database 1268 to obtain the requested information. In another example, the application server 1260 obtains information from one or more other computer systems in a serial arrangement, one after another. Once the information is received, the execution flow at the server 1210 continues executing and fulfils the user's request or takes another action. The execution flows at the different servers 1210 and 1260 may be considered to be related execution flows or related fragments or portions of an overall execution flow.

The agents 1215 and 1265 at the servers 1210 and 1260, respectively, may operate as discussed previously to aggregate their local execution flow data into execution flow shapes and provide the respective execution flow shape information to the manager 150 for analysis or other use. However, previously no mechanism has been available which allows the manager to correlate the execution flow information received from different computer systems or, more generally, from different processes and/or threads on one or more computer systems. In such scenarios, a cross process or cross thread request is sent from a process or thread of a "producer" execution flow to initiate execution of a process or thread of a "consumer" execution flow. A consumer process or thread can also be a producer when it initiates other cross process or cross thread requests to other consumers. Additionally, a single producer can send work to multiple consumers, e.g., when executing multiple iterations of a loop, or broadcasting or multicasting a single request to multiple consumers.

To enable the producer and the consumer execution flows to be correlated at the manager, the producer execution flow can provide meta data with its request, for instance. For example, the application server 1210, on which a producer execution flow runs, may communicate meta data with its request to the application server 1260 to initiate a consumer execution flow. The meta data may be generated by the associated agent 1215, for example. The agent associated with the consumer execution flow can use the meta data in aggregating the local execution flow data into execution flow shapes before communicating the execution flow shapes and meta data to the manager. For instance, the agent 1265 at the application server 1260 can aggregate the local execution flow data, and communicate it to the manager 150 with the meta data. In one possible approach, different data sets can be maintained for execution flows which are categorized into the same execution flow shape but which have different meta data. Execution flows which are categorized into the same execution flow shape and have the same meta data can be aggregated into the same data set.

Moreover, the meta data can be essentially piggybacked on the request communicated by the producer execution flow, e.g., by using the same communication mechanism. In this approach, there is no need to establish a separate connection or transmission path for communicating the meta data. For instance, the meta data can be transmitted by using external services such as JSR 149 "Work Area Service for J2EE™", which allows additional data to be transparently sent on remote calls in some protocols, such as remote Enterprise Java Bean calls, or by designing custom protocol-specific mechanisms for sending and receiving additional data with cross-process and cross-thread calls. Instrumentation can also be added to a method on the consumer that can look for the meta data and digest it if present. Example protocols that could be supported include Remote Method Invocation (RMI), HTTP, and JAVA™ Message Service (JMS) (a type of service for sending messages). The protocols can run on top of TCP/IP, for instance. Some of the protocols enable only sending data out to a consumer, in which case the producer cannot receive any responses. However, protocols that allow consumers to send data back to the producer, such as for synchronous requests, could also be used. Optionally, it is possible to communicate the meta data separately from the communication of the request, such as by establishing a separate connection, by using the connection for making the request after the request has been communicated, or by other means.

In one possible approach, the meta data includes a unique agent identifier that identifies the agent associated with the producer execution flow, an identifier of the current component being executed when the request is made, and execution flow context data, which can be, e.g., user facing data relating to the execution flow. The user facing data can be a Uniform Resource Locator (URL) associated with a user request, for instance.

The agent associated with the consumer execution flow can save the meta data and use it in aggregating the consumer execution flow data. For instance, two execution flows with the same shape, but different meta can be aggregated separately, allowing them to be differentiated by the manager and connected to data from different producer execution flows. Together, the execution flow shape and meta data can identify a single execution flow. When the manager receives this data, it can create producer/consumer relationships between the consumer execution flow data and the producer execution flow data by identifying the producer execution flows that correspond to the data stored in the meta data, and associating or correlating these producer execution flows with the corresponding consumer execution flows. The manager thus correlates the aggregated data which it receives from the different computer systems.

Note that some lossiness may occur since the same meta data can correspond to multiple producer execution flows, and a single producer execution flow can correspond to multiple consumer execution flows. For instance, the same request for a stock quote may be processed differently depending on whether the request is made when the stock market is open, in which case real-time updated data is accessed, or closed, in which case archived data is accessed. Or, a computer system may receive a request when it is undergoing maintenance such as backing up data, in which case the request is handled by a different process. However, the agent identifier, context data and the identifier of the component that initiated the request to the consumer, e.g., the calling component, are typically specific enough to minimize the impact of any lossiness.

The approach described results in various advantages. For instance, it avoids the need to send the producer execution flow data to the consumer, which would otherwise be required to correlate the producer and consumer execution flows. However, it is also possible for the functionality of the manager to be combined with the functionality of one or more of the agents. The meta data consumes a very small amount of data compared to the data needed to send the execution flow shape to the second computer system. Moreover, the data collected by the manager represents all cross process and cross thread execution flows executing in the system.

Note that, as an alternative to the use of meta data, other correlation strategies may be employed, such as tracking the time of the request and the host and port on both sides of the connection on both the producer and consumer sides. This information can then be correlated downstream without the need to send meta data between the two servers.

Figure 12B:
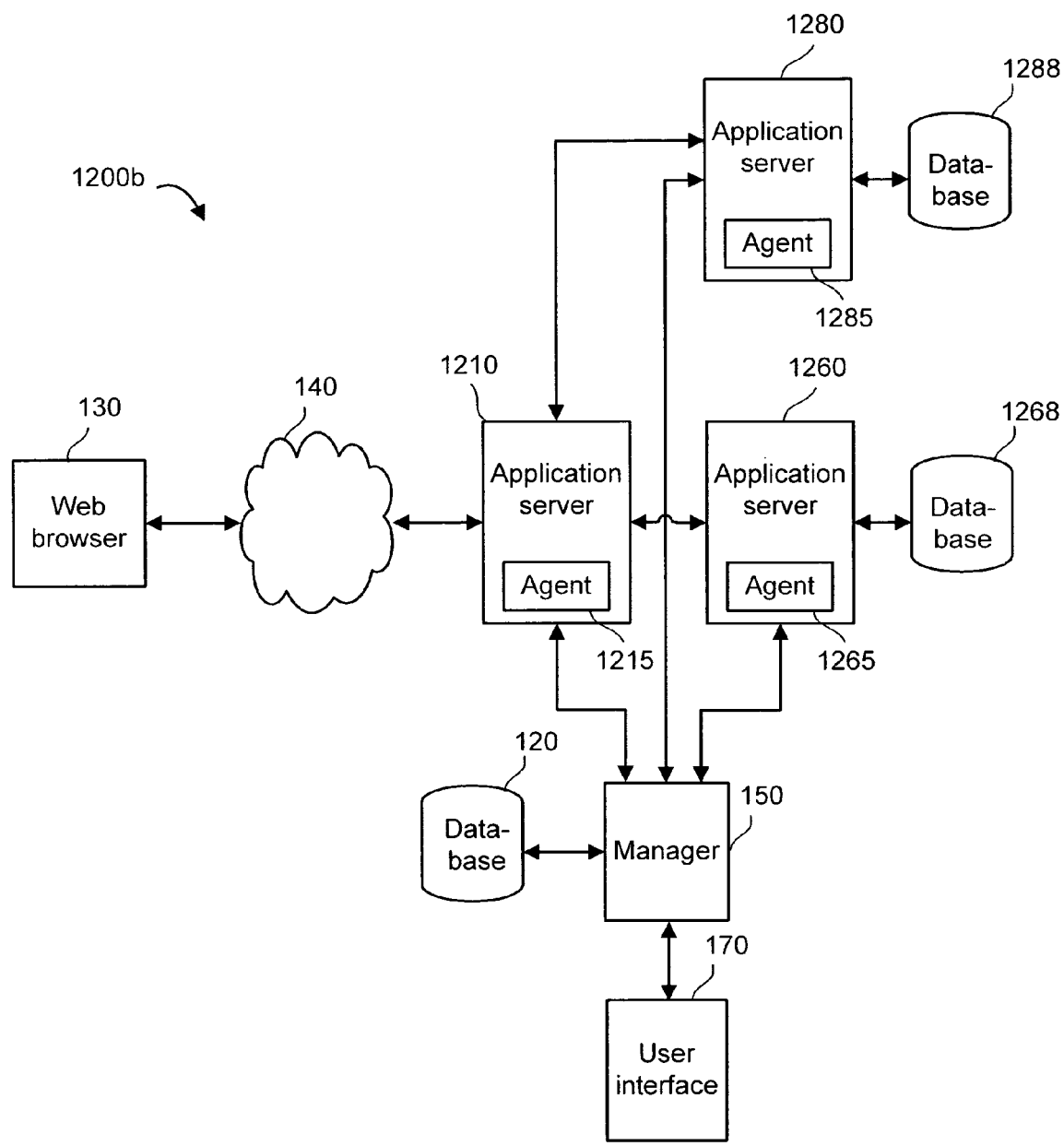
FIG. 12b depicts an alternative network in which different computer systems provide related aggregated execution flow data to a manager.

FIG. 12*b* depicts an alternative network in which different computer systems provide related execution flow data to a manager. Generally, correlation can be performed for any number of computer systems, as well as any number of execution flows. For example, in the network 1200*b*, the application server 1210 obtains information from an additional application server 1280, e.g., to fulfill the request made by the user at the web browser 130. Again, fulfilling a request is merely one example of essentially any type of action that can be performed by the application server 1210. The application server 1210 can send a request, with meta data, to the application server 1280 which, in turn, executes an execution flow for fulfilling the request. The application server 1280 itself may need to access an external source, such as a database 1288 to obtain the requested information. Once the information is received, the execution flow at the server 1210 continues executing and fulfils the user's request or takes another action. An agent 1285 at the server 1280 aggregates its local execution flow data into execution flow shapes and provide the respective execution flow shape information, with the associated meta data, to the manager 150 for analysis or other use. For example, the manager 150 can use the meta data to correlate the execution flows of the servers 1210 and 1280. The execution flows of the servers 1210, 1260 and 1280 can likewise be correlated with one another.

Figure 13A:
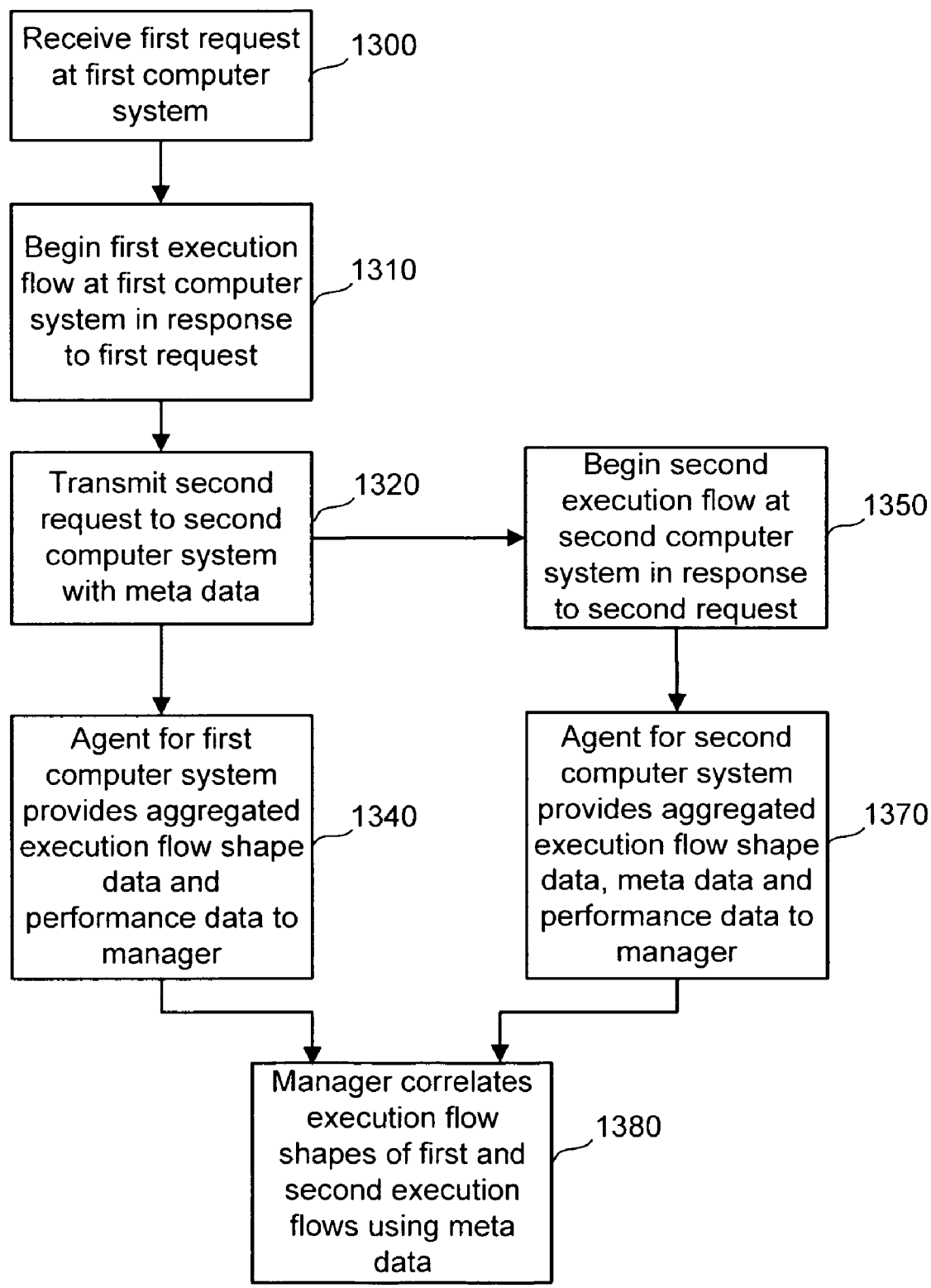
FIG. 13a depicts a method for correlating aggregated execution flow data from different computer systems.

FIG. 13*a* depicts a method for correlating aggregated execution flow data from different computer systems. The example is discussed in terms of a first computer system having a first execution flow and second computer system having a second execution flow.

At step 1300, the first computer system 110 receives a first request and, at step 1310, a first execution flow begins at the first computer system in response to the first request. The execution flow may involve invoking components or consuming other resources. For example, the first execution flow may invoke a component which causes a second request, with meta data, to be transmitted to the second computer system, at step 1320. At step 1350, the second computer system initiates a second execution flow in response to the receipt of the second request and meta data. The second execution flow can involve performing essentially any action. At step 1370, an agent for the second computer system provides aggregated execution flow shape data based on the second execution flow, along with the meta data, and performance data, to the manager. Optionally, the agent provides the second execution flow data without aggregation to the manager.

At step 1340, an agent at the first computer system provides aggregated execution flow shape data based on the first execution flow, along with performance data, to the manager. Optionally, the agent provides execution flow data without aggregation to the manager. It is not necessary for the agent at the first computer system to provide the meta data to the manager, although this is possible. At step 1380, the manager correlates the execution flow shape data of the first and second execution flows using the meta data.

Figure 13B:
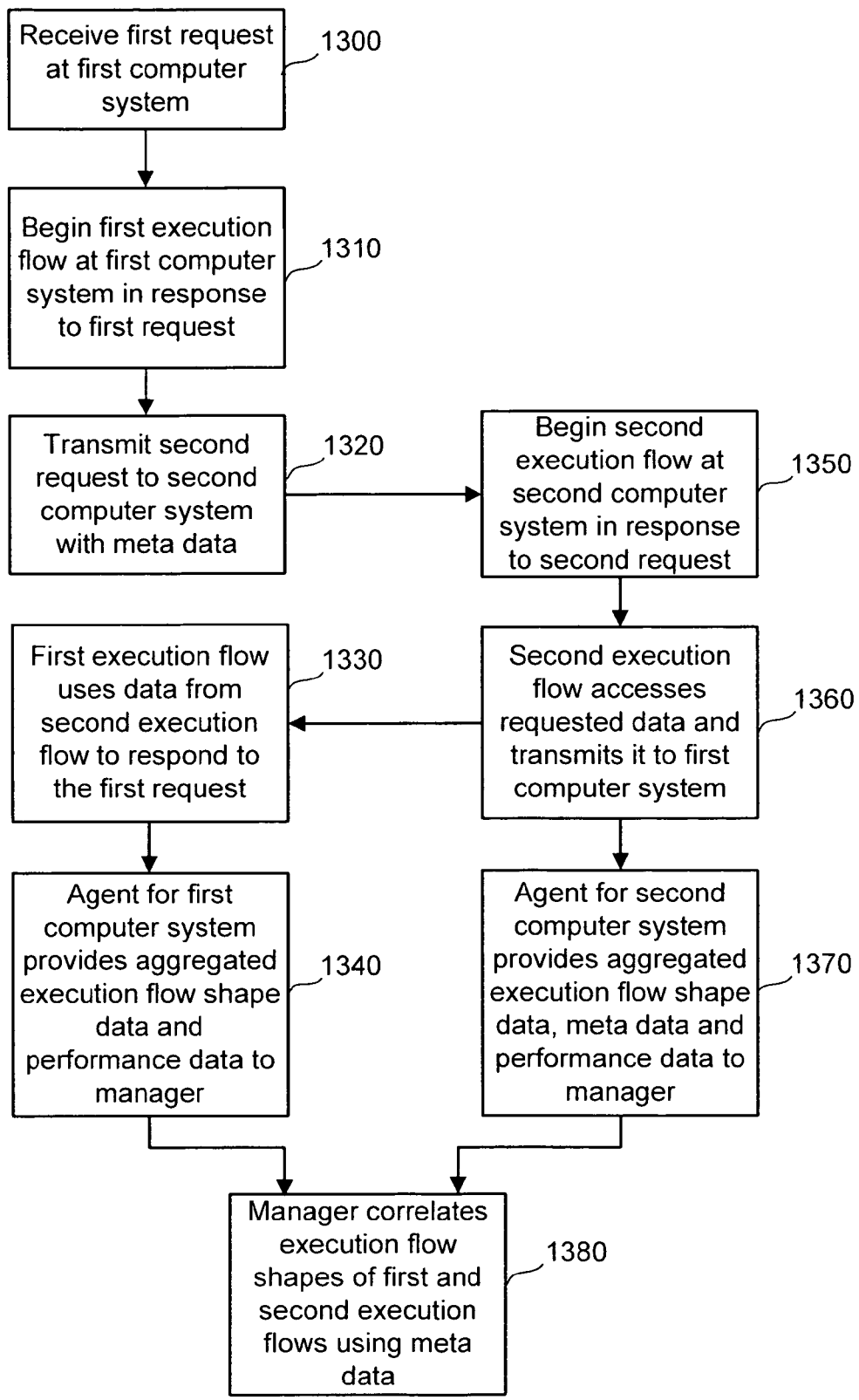
FIG. 13b depicts a method for correlating aggregated execution flow data from different computer systems, where a first computer requests information from a second computer.

FIG. 13*b* depicts a method for correlating aggregated execution flow data from different computer systems, where a first computer requests information from a second computer. At step 1300, the first computer system 110 receives a first request. For instance, a user may provide a request via a web browser to obtain a stock quote. However, the request can be made from another computer system, process or thread as well, such as a batch job request, timer-based request, or a predecessor execution flow. The request may be made to a web server which does not store stock quotes locally, but which needs to access another computer system 160 to obtain the requested information. At step 1310, a first execution flow begins at the first computer system in response to the first request. The execution flow may involve invoking components or consuming other resources which attempt to fulfill the first request. For example, the first execution flow may invoke a component which causes a second request, with meta data, to be transmitted to the second computer system, at step 1320. At this point, the first execution flow may pause to wait for a response to the second request before the remainder of the first execution flow executes.

At step 1350, the second computer system initiates a second execution flow in response to the receipt of the second request and meta data. At step 1360, the second execution flow accesses the requested information, e.g., by accessing a database, to obtain the requested data, and transmitting the data back to the first computer system, thereby completing the second execution flow. Accessing requested information is just one example of an action that can be performed by the second computer system. At step 1370, an agent at the second computer system provides aggregated execution flow shape data based on the second execution flow, along with the meta data, and performance data, to the manager. Optionally, the agent provides the second execution flow data without aggregation to the manager.

At step 1330, the first execution flow resumes, using the data received from the second execution flow, in the example provided, to respond to the first request, thereby completing the first execution flow. In responding to the first request, the first computer system may provide a web page with the stock quote, for instance. The first execution flow may also provide news and logos associated with the stock, as well as a graph template for displaying historical stock price data. At step 1340, an agent at the first computer system provides aggregated execution flow shape data based on the first execution flow, along with performance data, to the manager. At step 1380, the manager correlates the execution flow shape data of the first and second execution flows using the meta data.

To illustrate, assume the first request to the first computer system involves a request for a stock quote from a user that has a high priority account which allows the user to obtain stock quotes which are delayed only five minutes from real time stock market quotes. The request from the user may be in the form of a URL such as "www.stockprices.com/quotes?arg=apple&priority=high", where "apple" is the name of the company for which a stock quote is desired. The first execution flow is initiated in response to this request, and executes a process to obtain a stock quote for a high priority user. The first execution flow sends a second request to the second computer system to obtain a quote for "apple" with a five minute delay. The meta data that is included with the second request includes the context of the request, such as the URL, an identifier of the agent associated with the first computer system, e.g., "agent 1", and an identification of the component that made the request, e.g., "component 4", described below.

The identifiers of the agent and the component or other resource can be provided using any desired naming convention. For instance, when JMS is used for providing the request, the requesting component can have a JMS component name. At the second computer system, a second execution flow is initiated in response to receipt of the second request. The second execution flow may invoke a component which contacts a database which stores stock quotes with a five minute delay to obtain the requested stock quote. The second execution flow also executes a component that communicates the stock quote to the first execution flow. In particular, the component in the first execution flow which receives the data may be the same one that initiated the sending of the second request. In response to receipt of the data, execution of the first execution flow continues, and the first execution flow invokes a component which provides the stock quote to the user, such as in a web page.

Furthermore, the first execution flow is categorized into an execution flow shape by the agent at the first computer system. In a simplified example, the execution flow shape may include components such as: 1) receive user data request, 2) check user priority entitlement, 3) approve request, 4) request data from external source, 5) provide data to user, and 6) end execution flow. Note that an identifier of the component that made the request, e.g., "component 4" can be included in the meta data. Similarly, the second execution flow can be categorized, by an agent at the second computer system, into an execution flow shape including components such as: 1) receive request from external server, 2) check entitlement, 3) approve request, 4) request data from five minute delay database, 6) return data to requestor and 7) end execution flow. The agent at the first computer system reports its execution flow shape data, along with other information such as performance data, to the manager, while the agent at the second computer system reports its execution flow shape data, along with other information such as performance data, and the meta data, to the manager. The agents can also provide data to the manager that identifies themselves directly as the respective senders of the data.

The analysis at the manager can generally involve correlating execution flows or execution flow shapes from the different computer systems, or processes or threads, so that relationship between the execution flows or execution flow shapes can be revealed. For example, the business logic steps that are represented by the components in the first execution flow can be correlated with business logic steps that are represented by the components in the second execution flow. For instance, the manager may correlate the response time in obtaining a stock quote with information relating to the user that requested the stock quote. Appropriate corrective actions can be taken based on the analysis, if necessary.

Moreover, the agent at the first computer system can compress the context meta data that is provided in the second request. For example, when the first request includes a URL as context data, the representation of the URL in the meta data may be compressed. For instance, requests for stock data for different stocks from a high priority user can be represented as a generalized request for stock data from a high priority user, so that www.stockprices.com/quotes?arg=apple&priority=high and "www.stockprices.com/quotes? arg=ibm&priority=high" are represented by the context meta data "www.stockprices.com/quotes&priority=high". In another example, requests for stock data from high and low priority users can be represented as a generalized request for stock data from a generalized user, with the context meta data "www.stockprices.com/quotes". In either case, the specific data requested by the first execution flow is still included in the request. Compression of the context meta data can also occur at the second computer system, alternatively or in addition. Compression of the context meta data can affect the aggregation of the consumer execution flow data with the meta data since there will be fewer distinct occurrences of meta data. The decision to use compression, and the degree of compression to use, are configurable design choices based on the desired level of detail.

Although the above example referred to execution flows running on different computer systems, the approach is applicable to any type of inter-process communication, including the case where multiple processes and/or threads are running on one or more computer systems. In this case, a process or thread communicates a request to another process or thread, and includes meta data with the request. Moreover, when a number of execution flows request information from one another serially, one after another, and generate meta data, each execution flow can report the meta data from the immediate predecessor execution flow, along with the local execution flow shape data, to the manager. For instance, in the example of FIG. 12, the second server 1260 received meta data from the server 1210 and reported it to the manager. The server 1260 could potentially provide its own meta data to another, third server, which in turn could report this meta data to the manager with its local execution flow shape data. The meta data provided by the server 1260 could include identifiers of the local agent and requesting component as well as the context data from the server 1210. It is also possible for the server 1260 to provide both its own meta data and the meta data from the server 1210 to the third server. The procedure could be repeated accordingly for successive computer systems and/or execution flows. The manager could then use the meta data from the second and third servers to correlate their execution flow shape data with the execution flow shape data of the first server 1210.

Figure 14:
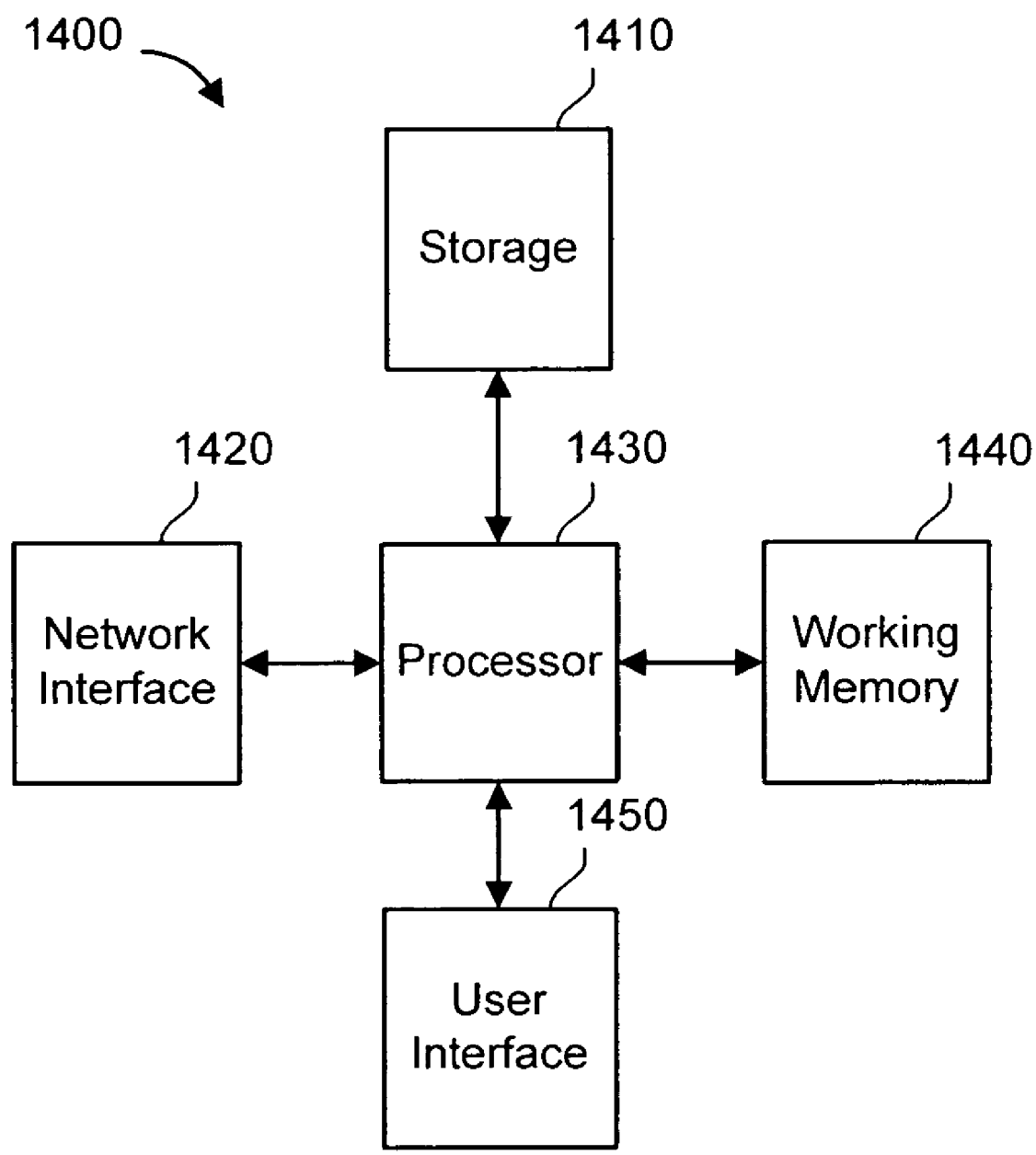
FIG. 14 depicts a computer system.

FIG. 14 depicts a computer system. The computer system 1400 is a simplified representation of a system which might be used as the monitored computer system, such as the A6 computer systems 110 and 160 and the application servers 1210 and 1260, and the manager 150 (FIGS. 1 and 12). The computer system 1400 includes a storage device 1410 such as a hard disk or portable media, a network interface 1420 for communicating with other computer systems, a processor 1430 for executing software instructions, a working memory 1440 such as RAM for storing the software instructions after they are loaded from the storage device 1410, for instance, and a user interface display 1450, in particular, for the manager computer 150. The storage device 1410 may be considered to be a processor readable storage device having processor readable code embodied thereon for programming the processor 1430 to perform a method for monitoring execution flows. The user interface display 1450 can provide information to a human user based on the aggregated data received from one or more agents. The user interface display 1450 can use any known display scheme, whether graphical, tabular or the like, and include associated information, including performance, resource and annotative data, described previously. The user interface display 1450 can be geared toward the IT employees in a business rather than the software developer by providing names for the components which correspond to their function in a business or e-commerce process, for instance, as indicated, e.g., in FIGS. 2, 4 and 5.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. A computer-implemented method for monitoring an application running at a first computer system, comprising the computer-implemented steps of:

receiving information from probes of instrumented byte code of the application, the information is used to provide a plurality of execution flows at the application, each of the plurality of execution flows comprising a sequence of invoked software components, the information identifies start and stop times of the invoked software components, and start and stop times of the execution flows;

categorizing the plurality of execution flows into a single execution flow shape selected from a plurality of execution flow shapes, so that different sequences of invoked software components of the plurality of execution flows are represented by a single sequence of software components of the single execution flow shape, the categorizing comprises, for each of the plurality of execution flows, calculating distances which represent how closely the execution flow matches each of the plurality of execution flow shapes and selecting the single execution flow shape based on a smallest distance among the distances;

calculating execution times of the invoked software components of the plurality of execution flows which correspond to the software components of the single sequence of software components based on the start and stop times of the invoked software components;

calculating execution times of the plurality of execution flows based on the start and stop times of the plurality of execution flows;

providing slowest and fastest execution times and at least one of a median and a mean execution time of the software components of the single sequence of software components based on the calculating of the execution times of the invoked software components, and providing slowest and fastest execution times and at least one of a median and a mean execution time of the single execution flow shape, based on the calculating of the execution times of the plurality of execution flows; and reporting from the first computer system to a manager computer system: (i) the single execution flow shape, (ii) the slowest and fastest execution times and the at least one of the median and the mean execution time, for the software components of the single sequence of software components, and (iii) the slowest and fastest execution times and the at least one of the median and the mean execution time of the single execution flow shape, wherein one execution flow of the plurality of execution flows is provided by performing lossy compression on an uncompressed execution flow to reduce the uncompressed execution flow to a simplified form comprising a reduced number of components, and the one execution flow and the uncompressed execution flow are discarded once the plurality of execution flows have been categorized so that the one execution flow and the uncompressed execution flow are not reported from the first computer system to the manager computer.

2. The computer-implemented method of claim 1, wherein:
the plurality of execution flows are associated with multiple computer systems; and
the categorizing and the reporting are performed at the multiple computer systems.

3. The computer-implemented method of claim 1, wherein:
the one execution flow spans at least one of a thread and a process.

4. The computer-implemented method of claim 1, wherein:
data from the one execution flow is obtained and aggregated before data from all of the plurality of execution flows has been obtained.

5. The computer-implemented method of claim 1, wherein:
the computer-implemented method is performed by agent software of the first computer system.

6. The computer-implemented method of claim 1, further comprising:
combining information from each execution flow that occurs at the application during the monitoring of the application, into a data set that is reported from the first computer system to the manager computer, rather than using sampling in which information is lost for a particular execution flow of the application which is not selected for sampling.

7. A non-transitory processor readable storage device comprising processor readable code embodied thereon for programming a processor to perform the computer-implemented method of claim 1.

8. The computer-implemented method of claim 1, wherein:
the plurality of execution flows, the execution times of the plurality of execution flows, and the execution times of the invoked software components of the plurality of execution flows which correspond to the software components of the single sequence of software components of the single execution flow shape, are discarded without being reported.

9. The computer-implemented method of claim 1, further comprising:
responsive to the categorizing, determining a quantity of the execution flows which were categorized into the single execution flow shape; and
reporting the quantity from the first computer system to the manager computer system.

10. The computer-implemented method of claim 1, wherein:
each of the plurality of execution flows represents a transaction in which the sequence of invoked software components is represented by start and finish nodes for each invoked software component in the transaction.

11. The computer-implemented method of claim 10, wherein:
the start and stop times of the plurality of execution flows are start and stop times of the transactions.

12. The computer-implemented method of claim 10, wherein:
for each of the plurality of execution flows, a first of the start nodes indicates a start of the transaction and a last of the finish nodes indicates a finish of the transaction.

13. A computer-implemented method for monitoring an application running at a computer system, comprising the computer-implemented steps of:
observing a plurality of execution flows at the application, the observing comprises receiving information from probes of instrumented byte code of the application, the information comprises data from the plurality of execution flows, the observing is performed by agent software running at the computer system;
defining a plurality of execution flow shapes based on the observing, including a single execution flow shape which represents different execution flows of the plurality of execution flows which invoke different sequences of software components, each execution flow shape of the plurality of execution flow shapes comprise an ordered sequence of invoked software components, the single execution flow shape is a single ordered sequence of software components which represents different ordered sequences of the different execution flows, and the different ordered sequences have different invoked software components;
categorizing the plurality of execution flows into a single execution flow shape selected from the plurality of execution flow shapes;
calculating execution times of the invoked software components of the different execution flows which correspond to the software components of the single ordered sequence of software components based on start and stop times in the information of the invoked software components of the different execution flows;
calculating execution times of the different execution flows based on start and stop times in the information of the different execution flows; and
providing slowest and fastest execution times and at least one of a median and a mean execution time of the software components of the single ordered sequence of software components based on the calculating of the execution times of the invoked software components, and providing slowest and fastest execution times and at least one of a median and a mean execution time of the single execution flow shape based on the calculating execution times of the different execution flows, wherein one execution flow of the plurality of execution flows is provided by performing lossy compression on an uncompressed execution flow to reduce the uncompressed execution flow to a simplified form comprising a reduced number of components, and the one execution flow and the uncompressed execution flow are discarded once the plurality of execution flows have been categorized so that the one execution flow and the uncompressed execution flow are not reported from the computer system to a manager computer.

14. The computer-implemented method of claim 13, further comprising the computer-implemented step of:
once the execution flows have been categorized, reporting to the manager computer a quantity of the execution flows which were categorized into each execution flow shape.

15. The computer-implemented method of claim 13, wherein:
the observing comprises observing sequences of software components which are invoked for the execution flows; and
the defining comprises grouping analogous observed sequences.

16. The computer-implemented method of claim 13, wherein:

the one of the execution flows spans at least one of a thread and a process.

17. A computer-implemented method for monitoring an application running at a computer system, comprising the computer-implemented steps of:

receiving aggregated data from the computer system, agent software running at the computer system receives information from probes of instrumented byte code of the application, the aggregated data representing execution flows which were categorized by the agent software based on the information from the probes into a corresponding execution flow shape selected from a plurality of available execution flow shapes, including multiple different execution flows which were categorized into a single execution flow shape, the multiple different execution flows invoke different sequences of software components, such that different ordered sequences of the multiple different execution flows are categorized into a single ordered sequence of software components of the single execution flow shape, and the different ordered sequences have different invoked software components;

the aggregated data comprising slowest and fastest execution times and at least one of a median and a mean execution time of the software components of the single ordered sequence of software components, and slowest and fastest execution times and at least one of a median and a mean execution time of the single execution flow shape;

the slowest and fastest execution times and the at least one of the median and the mean execution time of the software components of the single ordered sequence of software components, are calculated from execution times of the software components of the multiple different execution flows which correspond to the software components of the single ordered sequence of software components based on start and stop times of the software components of the multiple different execution flows;

the slowest and fastest execution times and at least one of the median and the mean execution time of the single execution flow shape, are calculated from execution times of the plurality of execution flows based on start and stop times of the plurality of execution flows; and storing the aggregated data for subsequent use, wherein one execution flow of the plurality of execution flows is provided by performing lossy compression on an uncompressed execution flow to reduce the uncompressed execution flow to a simplified form comprising a reduced number of components, and the one execution flow and the uncompressed execution flow are discarded once the execution flows have been categorized so that the one execution flow and the uncompressed execution flow are not reported from the computer system to a manager computer.

18. The computer-implemented method of claim 17, wherein:
the aggregated data comprises performance data associated with each of the execution flow shapes.

19. The computer-implemented method of claim 17, wherein:
each of the available execution flow shapes represents a sequence of software components which are invoked.

20. The computer-implemented method of claim 17, further comprising:
receiving aggregated data from multiple computer systems, the aggregated data represents execution flows which were categorized by agent software at each computer system based on received information from probes of instrumented byte code of an application at each computer system.

21. The computer-implemented method of claim 17, wherein:
the aggregated data indicates a quantity of the execution flows which were categorized into each of the execution flow shapes.

22. The computer-implemented method of claim 17, wherein:
the one of the execution flows spans at least one of a thread and a process.

23. The computer-implemented method of claim 17, wherein:
the aggregated data combines information from each execution flow that occurs at the application during the monitoring of the application, into a data set that is reported by the computer system, rather than using sampling in which information is lost for a particular execution flow of the application which is not selected for sampling.

24. A non-transitory processor readable storage device comprising processor readable code embodied thereon for programming a processor to perform the computer-implemented method of claim 17.

25. A non-transitory processor readable storage device comprising processor readable code embodied thereon for programming at least one processor to perform a method for monitoring an application running at a computer system, the method comprising:

observing a plurality of execution flows at the application, the observing comprises receiving information from probes of instrumented byte code of the application, the information comprises data from the plurality of execution flows, the observing is performed by agent software running at the computer system;

defining a plurality of execution flow shapes based on the observing, the plurality of execution flow shapes comprising a single execution flow shape which represents different execution flows of the plurality of execution flows which invoke different sequences of software components, each execution flow shape of the plurality of execution flow shapes comprises an ordered sequence of invoked software components, the single execution flow shape is a single ordered sequence of software components which represents different ordered sequences of the different execution flows, and the different ordered sequences have different invoked software components;

categorizing the plurality of execution flows into a single execution flow shape selected from the plurality of execution flow shapes;

calculating execution times of the invoked software components of the different execution flows which correspond to the software components of the single ordered sequence of software components based on start and stop times in the information of the invoked software components of the different execution flows;

calculating execution times of the different execution flows based on start and stop times in the information of the different execution flows; and providing slowest and fastest execution times and at least one of a median and a mean execution time of the software components of the single ordered sequence of software components based on the calculating execution times of the invoked software components, and providing slowest and fastest execution times and at least one of a median and a mean execution time of the single execution flow shape based on the calculating execution times of the different execution flows, wherein one execution flow of the plurality of execution flows is provided by performing lossy compression on an uncompressed execution flow to reduce the uncompressed execution flow to a simplified form comprising a reduced number of components, and the one execution flow and the uncompressed execution flow are discarded once the plurality of execution flows have been categorized so that the one execution flow and the uncompressed execution flow are not reported from the computer system to a manager computer.

26. The processor readable storage device of claim 25, wherein the method performed by the at least one processor further comprises:
  once the execution flows have been categorized, reporting to the manager computer a quantity of the execution flows which were categorized into each execution flow shape.

27. The processor readable storage device of claim 25, wherein:
  the observing comprises observing sequences of software components which are invoked for the plurality of execution flows; and
  the defining comprises grouping analogous observed sequences.

28. The processor readable storage device of claim 25, wherein:
  the one of the execution flows spans at least one of a thread and a process.

29. The processor readable storage device of claim 25, wherein:
  the defining comprises compressing data representing the execution flows using lossy compression in which each execution flow is reduced to a simplified form comprising a least number of components, to provide compressed execution flows.

30. A computer-implemented method for monitoring an application running at a first computer system, comprising the computer-implemented steps of:
  receiving information from probes of instrumented byte code of the application, the information is used to provide a plurality of execution flows at the application, each of the plurality of execution flows comprising: a sequence which represents start and finish nodes for each component in a transaction, and a calling relationship between the components in the transaction, the plurality of execution flows comprise different sequences of start and finish nodes;
  categorizing the plurality of execution flows into a single execution flow shape selected from a plurality of execution flow shapes so that the plurality of execution flows are represented by the single execution flow shape and the different sequences of start and finish nodes are represented by a single sequence of start and finish nodes of the single execution flow shape;
  for each of the plurality of execution flows, calculating an execution time based on a first of the start nodes and a last of the finish nodes;
  providing slowest and fastest execution times and at least one of a median and a mean execution time of the single execution flow shape based on the calculating; and
  reporting from the first computer system to a manager computer system: (i) the single execution flow shape, and (ii) the slowest and fastest execution times and the at least one of the median and the mean execution time of the single execution flow shape, wherein one execution flow of the plurality of execution flows is provided by performing lossy compression on an uncompressed execution flow to reduce the uncompressed execution flow to a simplified form comprising a reduced number of components, and the one execution flow and the uncompressed execution flow are discarded once the plurality of execution flows have been categorized so that the one execution flow and the uncompressed execution flow are not reported from the first computer system to the manager computer.

31. The computer-implemented method of claim 30, wherein:
  for each of the plurality of execution flows, the first of the start nodes indicates a start of the transaction and the last of the finish nodes indicates a finish of the transaction.

32. The computer-implemented method of claim 30, further comprising:
  for each of the plurality of execution flows, calculating execution times for the components based on the start and finish nodes which correspond to the single sequence of start and finish nodes of the single execution flow shape; and
  providing, and reporting from the first computer system to the manager computer system, slowest and fastest execution times and at least one of a median and a mean execution time of the components based on the calculating execution times for the components.

* * * * *